(12) United States Patent
Feldstein

(10) Patent No.: US 9,267,327 B2
(45) Date of Patent: Feb. 23, 2016

(54) SHADING CONTROL NETWORK USING A CONTROL NETWORK

(71) Applicant: Crestron Electronics, Inc., Rockleigh, NJ (US)

(72) Inventor: George Feldstein, Rockleigh, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 0 days.

(21) Appl. No.: 14/306,685

(22) Filed: Jun. 17, 2014

(65) Prior Publication Data

US 2015/0361719 A1 Dec. 17, 2015

(51) Int. Cl.
*E06B 9/68* (2006.01)
*E06B 9/72* (2006.01)
*H05B 37/02* (2006.01)

(52) U.S. Cl.
CPC .............. *E06B 9/72* (2013.01); *H05B 37/0263* (2013.01); *E05Y 2400/42* (2013.01); *E05Y 2400/61* (2013.01); *E06B 2009/6809* (2013.01)

(58) Field of Classification Search
CPC ............ E05Y 2400/41; E05Y 2400/42; E05Y 2400/61; E06B 9/72; E06B 2009/6809; H05B 37/0263
USPC ........ 160/310, 115, 116, 331, 84.02, 87, 113, 160/84.01, 168.1 P, 254, 255, 124, 121.1, 160/120
See application file for complete search history.

(56) References Cited

U.S. PATENT DOCUMENTS

| | | | |
|---|---|---|---|
| 5,372,173 A | 12/1994 | Horner | |
| 6,983,783 B2 | 1/2006 | Carmen, Jr. et al. | |
| 7,085,627 B2 | 8/2006 | Bamberger et al. | |
| 7,389,806 B2* | 6/2008 | Kates | 160/5 |
| 7,950,827 B2* | 5/2011 | Veskovic | 362/276 |
| 2005/0288823 A1* | 12/2005 | Hesse et al. | 700/276 |
| 2013/0322281 A1* | 12/2013 | Ludlow | H04W 48/18 370/252 |
| 2015/0130641 A1* | 5/2015 | Rahman et al. | |

OTHER PUBLICATIONS

"A Methodology for Detailed Calculation of Iluminance Levels and Light Dimming Factors in a Room with Motorized Blinds Integrated in an Advanced Window", Tzempelikos, A., Thesis, Concordia University, Montreal, Quebec, Canada, 2001, National Library of Canada, 0-612-59299-5.

(Continued)

*Primary Examiner* — Blair M Johnson
(74) *Attorney, Agent, or Firm* — Crestron Electronics Inc.

(57) ABSTRACT

A control system (700) is disclosed that includes a room controller (704) transmitting signals to both a shade control network (716) and a light control network (718), directing that motorized roller shades (106) and dimmable lights (714) be set to desired intensity levels. The control system further includes an intelligent hub (710) that provides a trickle-charge re-charge current via power-over-Ethernet cables to batteries associated with each of the motorized roller shades for re-charging the batteries, thereby eliminating power supplies being installed within walls. The intelligent hub provides for communication with the room controller based on streaming protocol and with the shade control network based on event-based protocol. A computer (414) running user interface software may be connected to the system to facilitate programming.

10 Claims, 14 Drawing Sheets

(56) References Cited

OTHER PUBLICATIONS

"Active Load Management with Advanced Window Wall System; Research and Industry Perpectives," Lee, E., et al., Lawrence Berkeley National Laboratory, University of California, Jun. 1, 2002, http://escholarship.org/uc/item/5rv2v5wg.

"Integrated Performanc eof an Automated Ventirion Blind/Electric Lighting System in a Full-Scale Private Office," Lee, E. S., et al., Lawrence Berkeley National Laboratory, University of California, Sep. 1998.

"A Comprehensive Approach to Integrated Envelope and Lighting Systems for New Commercial Buildings," Lee, E. S., et al., Lawrence Berkeley National Laboratory, University of California, May 1994.

"Perspectives on Advanced Facades with Dynamic Glazings and Integrated Lighting Controls," Selkowitz, S. E., et al., Presented at CISBAT 2003 Innovatin iin Building Evnelopes and Enviroinmental Systems, International Conferences on Solar Energy in Building, Oct. 8, 2003, Ecole Polytechnique Federale de Lausanne, Lausanne, Switzerland.

\* cited by examiner

SHADING CONTROL NETWORK USING A CONTROL NETWORK

CROSS REFERENCE TO RELATED APPLICATIONS

Related subject matter is disclosed in co-pending U.S. Non-provisional patent application Ser. No. 14/306,656, filed Jun. 17, 2014, entitled "Shading Control Network Using a Control Network."

BACKGROUND OF THE INVENTION

1. Technical Field

Aspects of the embodiments relate to an integrated home automation system that includes centralized control for controlling motorized shades in a residential home.

2. Background Art

It is known to control the operation of a motorized shade or drapery by transmitting command signals to the motorized shade or drapery from a control system, thereby, directing the motor to move the shade or drape. Shades move in a vertical direction and wrap around a roller tube while drapes move in a horizontal direction. One known example of a control system that operates motorized screens, drapes, and curtains is illustrated in a 1989-1999 catalog published by Crestron Electronics, Inc.

Furthermore, one skilled in the art of network control system design would recognize that there is no difference between the type of commands used to control shades, lighting, slide projectors, and other pieces of interfacing equipment. Certain of prior art patents, such as U.S. Pat. No. 7,085,627 ("the '627 patent"), assigned to Lutron Electronics Inc., purport to distinguish between various subsystems that could be used in all overall home automation system, such as a "lighting system," a "shade network," and a "security system." However, these patents are typically written from the aspect of a company that specializes in one of the subsystems (i.e. Lutron Electronics, Inc. specializes in lighting) and not from the point of view of a company specializing in control systems (i.e. AMX, Control4, Crestron, or Savant).

It would have been apparent to one skilled in the art of computer network technology that there are no basic network design features (i.e. physical layer, baud rate or network topology) that would be different based on whether a network was used to control residential shades, residential lighting, or other residential systems. So, regardless of certain representations made in the '627 patent there simply has not been any difference between shade control communication networks and lighting control networks.

FIG. 1 illustrates a conventional shade system 100 that includes motorized roller shade (shade) 106 that is used to cover window 108. Shade 106 includes flexible shade fabric 104 that is windingly received onto rotatably supported roller tube 102. Shade 106 also includes an electric motor (not shown) that drivingly engages roller tube 102 in order to rotate roller tube 102. It is known to control such shade 106 from a centralized location as part of an overall home automation system.

Referring now to FIG. 2, it would have been clear to a network designer, since at least the late 1980's, that there are several basic network topologies available for interconnecting various computer-controlled devices, such as for example, interconnecting the various devices of a home automation system. Several different network topologies are shown in FIG. 2, and described below.

In bus network topology 202, each node is connected to a single cable 203. A signal from a source node travels in both directions to all nodes connected on the bus cable 203 until it finds the intended recipient node. In all the network topologies shown in FIG. 2, the central, source, or hub node, is shown as the solid, shaded circle, and the attached nodes (which generally represent computers, or in the case of a home automation system, microcontrollers), are shown as the empty, un-shaded circles. In bus network topology 202, if the intended recipient address, for a particular data packet, does not match any address of a node connected to the bus, then that data packet is ignored. Alternatively, if the intended recipient address matches the address of a node connected to the bus, then that data packet is accepted at that node. Since bus topology 202 consists of only one cable 203, it is rather inexpensive to implement when compared to other network topologies. However, the low cost of implementing the technology is offset by the high cost of managing the network. Such cost is partially related to the cost of adding other nodes (or computers), which includes running the bus (cable 203) to the new node and/or a bus-feed to the existing main bus. Additionally, since only one cable is utilized, it can be a single point of failure that takes down the entire network. In terms of home (or commercial) automation systems, additional limitations can include that only a limited amount of power can be transferred to devices on bus network 202 from the central node. If additional nodes are added that require additional power, a new power supply could be required, but there is a limit as to how much power can be transferred over conventional cabling for bus network topology 202.

In local area networks where star network topology (star network) 204 is used, each node is connected to a central hub with a point-to-point connection. Star network 204 does not necessarily have to resemble a star to be classified as a star network, but all of the nodes on star network 204 must be connected to the one central hub. All traffic that traverses star network 204 passes through the central hub, and as such, the central hub acts as a signal repeater. The star topology is considered the easiest topology to design and implement. An advantage of star network 204 is the simplicity of adding additional nodes. The primary disadvantage of star network 204 is that the hub represents a single point of failure; if it fails, no communications can take place (whereas in bus network 202, a non-source node (the one or more unshaded nodes) can take over as the source node). In terms of automation systems, star network 204 can transfer larger amounts of power, because each interconnecting cable only has to handle the power that its end node requires (i.e., one cable does not carry all of the current for the entire network), although a new power supply at some point might be required. However, each time a new node is added, the cable must be "home-runned" back to the central (or source) node, which can be costly.

Another local area network is daisy-chain network topology (daisy-chain network) 206. In daisy-chain network 206, it is fairly easy and straightforward to add more computers into the network by daisy-chaining, or connecting each computer in series to the next. If a message is intended for a computer partway down the line, each system bounces it along in sequence until it reaches the destination. A daisy chain network can take two basic forms: linear and ring. In terms of automation systems, daisy chain network 206 is also problematic in terms of power because all of the power needs to be transferred through one cable, similarly to bus network 202; thus, there are practical limitations as to the number of devices that can be attached and/or the total power that can be provided. If additional power is required in nodes further down the line in the daisy chain, then local transformers or other power supplies could be necessary to provide the additional power.

A linear topology in a daisy chain network 206 puts a two-way link between one computer and the next. By connecting the computers at each end, a ring topology can be formed. An advantage of the ring topology is that the number of transmitters and receivers can be cut in half, since a message will eventually loop all of the way around. When a node sends a message, the message is processed by each computer in the ring. If the ring breaks at a particular link then the transmission can be sent via the reverse path thereby ensuring that all nodes are always connected in the case of a single failure.

Tree network topology (tree network) 208 is also shown in FIG. 2. The topology of tree network 208 is based on a hierarchy of nodes. The highest level of any tree network consists of a single, or 'root' node 210 (i.e., the sold circle of tree network 208). Root node 210 is connected either to a single (or, more commonly, multiple) node(s) 212 in the level below by point-to-point links (note that root node 210 is connected first to first lower level node 212a, and then first lower level node 212a is connected to first lower level node 212b, and so on). These first lower level nodes 212 are also connected to a single or multiple second lower level nodes 214 in the next level down. Tree networks 208 are not constrained to any number of levels, but as tree networks 208 are a variant of bus network 202 topology, they are prone to crippling network failures should a connection in a higher level of nodes fail/suffer damage (i.e., if first lower level node 212a failed, everything would essentially fail as root node 210 is then cut off from all of the other nodes). Each node in the network has a specific, fixed number of nodes connected to it at the next lower level in the hierarchy ("lower" referring to levels away from root node 210; the first lower level including first lower level nodes 212, the next lower level including second lower level nodes 214, and so on), this number being referred to as the 'branching factor' of the tree.

While tree networks 208 are capable in terms of data throughput, in terms of power distribution, tree networks 208 suffer from the same limitations as bus network 202 and daisy chain network 208 in that all of the power must be transferred by the first cable from the central node; further, because of the nature of the "tree" like growth, there is no way of knowing in advance how much power each branch might ultimately have to transfer. If additional power is required in nodes further down the branches of the "tree," then local transformers or other power supplies could be necessary to provide the additional power.

The last network topology to be discussed in regard to FIG. 2 is mesh network 216, which is a network topology in which each node (called a mesh node) relays data for the entire network. All nodes cooperate in the distribution of data in mesh network 216. Mesh network 216 typically has a self-healing capability that enables data rerouting when one node breaks down or a connection goes bad. As a result, mesh network 216 is typically quite reliable, as there is often more than one path between a source and a destination in mesh network 216. Although mostly used in wireless situations (shown as dashed lines), the "mesh network" concept is also applicable to wired networks (solid lines) and software interaction. Mesh networks 216 are applicable to data only, as power cannot be effectively transferred wirelessly.

Mesh networks 216 can be designed using a flooding technique or a routing technique. When using a routing technique, the message is propagated along a path, by hopping from one node to the next node until the destination is reached. To ensure all its paths' availability, a routing network must allow for continuous connections and reconfiguration around broken or blocked paths using self-healing algorithms. A flooding technique is one in which the message is transmitted to all of the nodes of mesh network 216. The attractiveness of the flooding technology lies in its high reliability and simplicity. As those of skill in the art can appreciate, there is no need for sophisticated routing techniques since there is no routing. No routing means no network management, no need for self-discovery, no need for self-repair, and, because the message is the payload, no overhead for conveying routing tables or routing information.

A mesh network whose nodes are all connected to each other is a fully connected network. A fully connected network can be costly, as either a wired connection is required between each node (or computer) or a wireless interface needs to be installed. Of course, the wireless interface can save wiring costs, but can also prove to be less reliable (and slower) under some conditions, as those of skill in the art can appreciate.

Attention is now directed to FIG. 3. FIG. 3 illustrates a conventional automated combined shading and lighting control network system (control system) 300 that is suitable for use in, among other places, a hotel suite, for controlling motorized roller shades, lighting, televisions, among other devices. It is known by those of skill in the art to provide a centralized control system that provides both lighting and shading control functions. Such a centralized system is shown in FIG. 3.

Control system 300 includes room controller 302, set top box 304, television 306, bus 308 (which can be RS-485, or Cresnet®), interface units (IUs) 310, transformers 312, light dimmers 314, keypads 316, and shades 106. Bus 308 is typically capable of carrying 24 VDC. Those of skill in the art can appreciate that other devices, not shown, can also be included in control system 300. For example, room controller 302 can also be directly connected to, or indirectly connected to (through other routers (not shown)), wide area network (WAN) 322, such as the Internet. In addition, IUs 310 can be wall mountable for the case of local and remote control of shades 106, desk mounted, or located elsewhere. Room controller 302 can also be connected to IU 310 for controlling shades 106, and can also connected to light dimmers 314 (which are typically wall-mountable) for controlling the dimmable lighting loads. Room controller 302 and transformers 312 are further provided for controlling motorized roller shades 106 by controlling the motors therein to position shades and drapes. An early example of such a centralized control system is "The Crestron New Generation Total Control System", circa 1998. In some configurations, IUs 310 also provide signals, typically in digital form (although they can also generate analog signals) to control a collection of one or more relays that provide power and control signals to the motors in motorized roller shades 106. The relays can be controlled by bus 308 so that power can be forwarded to motorized roller shades 106 from transformers 312, alone with control signals that are delivered by bus 308.

Room controller 302 can transmit command signals to light dimmer 314 for directing that the dimmable loads be set to particular intensity levels that can range from between 0 and 100 percent. Likewise, room controller 302 can also transmit command signals directing that the motorized shades be set to various positions that can range from between fully closed and fully open. Control system 300 can further include microprocessors at each of motorized roller shades 106 in IUs 310 that are connected to the network for transmitting control signals and for storage of a database including network-related information. However, it is also known to those of skill in the art that some control systems 300 do not include processors in any of IU's 310 and/or motorized roller shades 106.

Control system 300 is programmable such that preset shade positions for shades 106 can be stored in control system 300 for subsequent selection by a user by actuation of a preset actuator provided by IU 310. Control system 300 is also programmed to address other devices connected to the network with a unique identifier to provide for network communication between the devices and to provide for centralized control of shades 106. The "other devices" can include television 306, set top box 304, as well as light dimmer 314 and keypad 316 (which can used to enter a code to unlock a door, or a card swipe, that can read a magnetic strip, also to unlock the door). Control system 300 is also programmed to assign the electronic drive unit (EDU) 326 of each of shades 106 of control system 300 to one of the wall-mountable IUs 310 for control of its respective EDU 326 from the wall-mountable IU 310. Note also that for each shade 106 there is a transformer 312 that provides the necessary voltages/power to motorized roller shade 106 via control of its respective IU 310. It is to be noted that the EDUs are relatively simple devices in this example and do no more than receive command signals from IUs 310, and transfer the data/commands as needed.

It has also been attempted in the prior art for shade 106 to mimic a light dimmer setting wherein, for example, a dimmer setting of 50% would be equivalent to opening a motorized window shade half-way. This leads, however, to obvious drawbacks in that the outdoor ambient light varies according many factors including season of the year and cloud cover.

It is known by those of skill in the art that connecting either shades or lighting controls to a network is not complicated using any one of several network protocols, such as, but not limited to, Crestron's "Cresnet®", Power over Ethernet, Zigbee, among others. However, it is also known to those of skill in the art that while any one of several network topologies can be used, as discussed above, each has problems associated with them. Furthermore, it is also known by those of skill in the art that conveying power to motorized roller shades, as shown and described in reference to FIG. 3, can involve the separate installation of in-the-wall mountable transformers 312 that presents a host of separate issues. First, there is the construction costs, and damage done to walls. Even if transformers 312 are not wall mounted, they still must be put somewhere, and they are relatively inefficient, generate heat, as well as electrical noise.

Thus, there is a need for a hybrid star and linked network with power storage capability at each node in order to provide desirable characteristics for a home, office, or hotel suite automation system that includes control of shades, audio speakers, among other devices.

SUMMARY OF THE INVENTION

It is to be understood that both the general and detailed descriptions that follow are explanatory only and are not restrictive of the embodiments.

According to one aspect of the embodiments, a shade control system includes a plurality of drive units each having a motor adapted for moving an associated shade member, and a plurality of drive unit controllers each capable of generating command signals for directing at least one of the drive units to move the associated shade member. The shade control system also includes a communication bus to which each of the drive units and drive unit controllers is connected in a common arrangement such that each one of the drive units and drive unit controllers can communicate with every other drive unit and drive unit controllers.

According to a further aspect of the embodiments, the shade member associated with each drive member is a shade fabric wound onto a roller tube. The drive unit controllers preferably include at least one keypad controller having an open limit actuator and a close limit actuator for generating command signals for moving the associated shade fabric of at least one of the drive units to a predetermined open limit position and a predetermined close limit position. The keypad controller also preferably includes a raise actuator and a lower actuator for generating command signals for moving the associated shade fabric of at least one of the drive units through raise and lower position adjustments.

DISCLOSURE OF INVENTION

According to a first aspect of the embodiments, a method for controlling lights and shades is provided, the method comprising transmitting controls signals from a room controller to one or more devices, wherein said control signals represent a desired intensity level setting, receiving the transmitted control signals at the one or more devices, transferring power to a first set of said one or more devices via a power-over-Ethernet (POE) cable, and converting said control signals to effectuate said desired intensity level setting, and wherein said one or more devices includes motorized roller shades and dimmable lighting devices. According to the first aspect of the embodiments, the step of converting comprises converting a first set of said control signals representing an intensity level setting of a shade such that the motorized roller shades changes a shade position of said shade to match the desired intensity level setting, and converting a second set of said control signals representing an intensity level setting of a dimmable light such that dimmable light controls changes a dimming setting of said dimmable light.

According to the first aspect of the embodiments, the step of converting said first set of control signals comprises transmitting a sequence of control signals to the motorized roller shades such that said motorized shade moves said shade in a series of substantially evenly timed steps of substantially equal distance to simulate a relatively slowly moving shade compared to a normal rate of driven movement for the motorized roller shade, and wherein a motor speed for the at least one motorized shade is variable and wherein the method further comprises transmitting a signal concurrently with the intensity level directing the at least one motorized shade to move to the associated shade position at a desired speed.

Still further according to the first aspect of the embodiments, the step of transmitting comprises transmitting said control signals from said room controller to an intelligent hub, wherein said control signals further include database information, and forwarding said controls signals from said intelligent hub to a first of one or more motorized roller shades via said POE cable, wherein each of said one or more motorized roller shades includes a respective electronic data unit for each of the at least one motorized roller shades, and wherein each of said electronic drive units includes an elongated motor, and a battery, and further wherein said battery is configured to provide operating power to said elongated motor. According to the first aspect of the embodiments, said step of transferring power comprises transmitting a trickle-charge re-charging current from said intelligent hub to said first set of said one or more devices over said POE cable, wherein said set of said one or more devices includes motorized roller shades, and wherein said POE cable is connected between said intelligent hub and each electronic data unit of each at least one or more motorized roller shades in a daisy chain fashion.

According to the first aspect of the embodiments, said electronic drive unit further includes control electronics, and wherein said control electronics includes an input interface, and an output interface, and wherein said input interface is configured to receive control signals, database information, and trickle-charge re-charging current from either a preceding electronic drive unit or intelligent hub via said POE cable, and wherein said output interface is configured to transmit control signals, database information, and trickle-charge re-charging current to a subsequent electronic drive unit via said POE cable.

According to the first aspect of the embodiments, said electronic drive unit further comprises a relay switch network configured to cause electrical power to selectively by-pass said electrical drive unit, and wherein said relay switch network is further configured to selectively allow one or more batteries in one or more different respective motorized roller shades to draw re-charging power from said battery in said motorized roller shade associated with said electrical drive unit.

Still further according to the first aspect of the embodiments, the motorized roller shade further comprises a shade, and a hem bar located at a bottom of said shade, wherein said hem bar includes one or more small batteries electrically connected to each other and said battery of said motorized roller shade, and wherein said small batteries are configured to provide a trickle-charge re-charging current to said battery of said motorized roller shade.

According to a second aspect of the embodiments, a method is provided for controlling lights and shades, the method comprising transmitting controls signals from a room controller to one or more devices, wherein said control signals represent a desired intensity level setting, receiving the transmitted control signals at the one or more devices, transferring power to a first set of said one or more devices from a transformer via a power cable, and converting said control signals to effectuate said desired intensity level setting, and wherein said one or more devices includes motorized roller shades and dimmable lighting devices.

According to the second aspect of the embodiments, the step of converting comprises converting a first set of said control signals representing an intensity level setting of a shade such that the motorized roller shades changes a shade position of said shade to match the desired intensity level setting, and converting a second set of said control signals representing an intensity level setting of a dimmable light such that dimmable light controls changes a dimming setting of said dimmable light, wherein the step of converting said first set of control signals includes transmitting a sequence of control signals to the motorized roller shades such that said motorized shade moves said shade in a series of substantially evenly timed steps of substantially equal distance to simulate a relatively slowly moving shade compared to a normal rate of driven movement for the motorized roller shade, and further wherein a motor speed for the at least one motorized shade is variable; and wherein the method further comprises transmitting a signal concurrently with the intensity level directing the at least one motorized shade to move to the associated shade position at a desired speed.

Still further according to the second aspect of the embodiments, the step of transmitting comprises transmitting said control signals from said room controller to a mesh network gateway, wherein said control signals further include database information, and forwarding said controls signals wirelessly from said mesh network gateway to each of said one or more motorized roller shades, wherein each of said one or more motorized roller shades includes a respective electronic data unit for each of said at least one motorized roller shades, and wherein each of said electronic drive units includes an elongated motor, and a battery, and further wherein said battery is configured to provide operating power to said elongated motor.

According to the second aspect of the embodiments, the step of transferring power comprises transmitting a trickle-charge re-charging current from said transformer to a first one of said motorized roller shades over said power cable, and wherein a power-over-Ethernet (POE) cable is connected between each electronic data unit of each at least one or more motorized roller shades in a daisy chain fashion, and wherein said electronic drive unit further includes control electronics, and wherein said control electronics includes an input interface, and an output interface, and wherein said input interface is configured to receive control signals, database information, and trickle-charge re-charging current from a preceding electronic drive unit, if so connected, via said POE cable, and wherein said output interface is configured to transmit control signals, database information, and trickle-charge re-charging current to a subsequent electronic drive unit via said POE cable.

According to the second aspect of the embodiments, said electronic drive unit further comprises a relay switch network configured to cause electrical power to selectively by-pass said electrical drive unit, and wherein said relay switch network is further configured to selectively allow one or more batteries in one or more different respective motorized roller shades to draw re-charging power from said battery in said motorized roller shade associated with said electrical drive unit. According to the second aspect of the embodiments, the motorized roller shade further comprises a shade, and a hem bar located at a bottom of said shade, wherein said hem bar includes one or more small batteries electrically connected to each other and said battery of said motorized roller shade, and wherein said small batteries are configured to provide a trickle-charge re-charging current to said battery of said motorized roller shade.

According to a third aspect of the embodiments, a method for controlling lights and motorized roller shades is provided, the method comprising providing a programmable room controller adapted to store preset intensity levels in a database of information for devices connected to the room controller, connecting the room controller to a lighting control network including at least one dimmable light, connecting the room controller to a shade control network that includes at least one motorized roller shade, programming the room controller to store preset intensity levels for the dimmable lights of the lighting control network in the database of information, programming the programmable room controller to store a preset intensity level for the at least one motorized roller shade of the shade control network in the database of information, transferring power to said shade control network via a power-over-Ethernet (POE) cable from an intelligent hub, and transmitting a portion of the database of information that includes the preset intensity level for the at least one motorized roller shade of the shade control network from the room controller to the shade control network, wherein the shade control network is configured to convert the preset intensity levels into preset shade positions.

According to the third aspect of the embodiment, the method further comprises connecting a keypad to the room controller, wherein the keypad is configured to transmit a command signal to the room controller regarding a selected preset intensity level for the at least one motorized shade of the shade control network in response to a user input, transmitting the command signal regarding the selected intensity level from the room controller to the shade control network; and directing the at least one motorized roller shade to move to the preset shade position associated with the selected intensity level.

According to the third aspect of the embodiments, a motor speed of a motor of the at least one motorized roller shade of the shade control network is variable and the method further comprises programming the room controller to store a desired motor speed associated with the preset intensity level for the at least one motorized roller shade of the shade control network in the database of information for directing the motorized roller shade to move to the associated preset shade position at the desired motor speed, and transmitting the motor speed with the associated preset intensity level to the shade control network in the portion of the database of information that includes the preset intensity level for the at least one motorized roller shade of the shade control network.

According to a fourth aspect of the embodiments, a method for controlling at least one motorized roller shade is provided, the method comprising providing a shade control network including at least one motorized roller shade, wherein each motorized roller shade is configured to transmit feedback information regarding shade position or other condition associated with a shade to the shade control network, providing a room controller connected to the shade control network for controlling the motorized roller shades of the shade control network, wherein the room controller is configured to receive the feedback information from the shade control network regarding the condition or position of the motorized roller shades, providing an intelligent hub connected to the room controller and the shade control network, the intelligent hub configured to store feedback information from the shade control network in memory for independent transmission to the room controller, and wherein said intelligent hub is further configured to transfer power to a first one of said motorized roller devices via a power-over-Ethernet (POE) cable, and transmitting feedback information from the motorized roller shades of the shade control system to the intelligent hub, and storing the feedback information for the motorized roller shades in a memory of the intelligent hub.

According to the fourth aspect of the embodiments, the method further comprises providing a timing device in the room controller for associating the shade position for the motorized roller shades to the time of day, transmitting shade position information from the motorized roller shades to the intelligent hub, retrieving the time of day from the timing device, storing the shade position information for the motorized roller shades and the associated time information in memory at the intelligent hub, transmitting the shade position information for the motorized roller shades and the associated time information from the intelligent hub to the room controller, creating a time-based macro program for directing the motorized roller shades of the shade control network to move to given positions at certain times of day based on the information transmitted to the room controller from the intelligent hub, and executing the time-based macro program.

According to the fourth aspect of the embodiments, the method further comprises providing a link between the room controller and the intelligent hub configured to transmit information in cycled packets of information based on a streaming protocol, and transmitting feedback information regarding the motorized roller shades of the shade control network from the intelligent hub to the room controller in a sequential manner using the streaming protocol such that any packet of information transmitted to the room controller that includes feedback information includes feedback information associated with only one of the motorized roller shades.

According to a fifth aspect of the embodiments, a method for controlling a shade control network including at least one motorized roller shade is provided, the method comprising providing a room controller having memory storage capability and an actuator, connecting the room controller to a motorized roller shade that includes a rotatably supported roller tube and a flexible shade fabric windingly received by the roller tube, programming the room controller to store in memory a first preset value associated with a first shade position and a second preset value associated with a second shade position, transferring power to a first one of said motorized roller shades via a power-over-Ethernet (POE) cable from an intelligent hub, and moving the motorized roller shade to the first preset shade position in response to an actuation of the actuator, and moving the motorized roller shade to the second preset shade position in response to a subsequent actuation of the actuator.

According to the fifth aspect of the embodiments, the motorized roller shade is toggled between the first and second shade positions in response to actuation of the actuator, the room controller includes a visual indicator located adjacent the actuator to provide a visual indication of the shade position to which the motorized roller shade is toggled to, and the room controller is programmed to set the first shade position by default to either a fully-opened shade position, or a fully-closed shade position.

According to a sixth aspect of the embodiments, a method is provided for programming a shade control network that includes at least one motorized roller shade, the shade control system including a communication network connected to each motorized roller shade, the method comprising connecting a computer having user interface capability to the communication network of the shade control network, transmitting at least a portion of a database of information regarding the shade control network from the computer to the shade control system, transferring power to said shade control network from an intelligent hub via a power-over-Ethernet (POE) cable, and storing the portion of the database of information received by the shade control network in a memory in the shade control network.

According to the sixth aspect of the embodiments, each of the motorized roller shades of the shade control network has memory storage capability, and the method further comprises connecting the computer to a room controller and the shade control network, transmitting substantially all of the database of information regarding the shade control network from the computer to the room controller, transmitting at least a portion of the database of information from the room controller to each of the motorized roller shades, storing the portion of the database of information in memory at each of the motorized roller shades of the shade control network, transmitting an acknowledgement of receipt of the database portion from each of the motorized roller shades to the room controller, and transmitting a report from the room controller to the computer regarding acknowledgement by the at least one motorized roller shade.

According to the sixth aspect of the embodiments, the programming method further comprises connecting said intelligent hub to the communication network of the shade control system to facilitate transfer of information with the shade control network, and connecting said room controller to said intelligent hub, wherein said room controller is part of an integrated control system, and said room controller is configured to control at least one other control system including a lighting control network in addition to the shade control network. Still further according to the sixth aspect of the embodiments, the programming method further comprises connecting a plurality of intelligent hubs to a plurality of shade control network, each shade control network including at least one motorized roller shade, and a communication network connected to each of the motorized roller shades, wherein said communication network includes a power-over-Ethernet cable, and an electronic data unit, and connecting the room controller to each of the intelligent hubs.

According to the sixth aspect of the embodiments, the programming method still further comprises directing the shade control network to move the motorized roller shades in a sequential manner in response to a series of user inputs to provide for unique identification of the motorized roller shades by the shade control network, directing the shade control network to move the motorized roller shades of the shade control network to provide for visual identification of a particular shade among a reduced number of shades in a first subset of shades, and further reducing the number of shades in subsequent subsets by repeating the step of directing the shade control network to move the motorized shades with respect to subsequent subsets until a subset is formed that includes only the particular motorized shade to provide for unique identification of the particular motorized shade by the shade control network, wherein half of the shades of a given subset are moved to form the next subset of shades including the particular shade.

According to the sixth aspect of the embodiments, the shade control network further includes at least one intelligent hub connected to the communication network, the at least one intelligent hub having memory storage capability for storage of database information regarding the shade control network, the method further comprising transmitting at least a portion of the database of information to each of the intelligent hubs of the shade control network, and storing the portion of the database of information in memory at each of the intelligent hubs of the shade control network.

The aspects of the embodiments described herein seek to overcome or at least ameliorate one or more of several problems, including but not limited to providing an efficient system of networked motorized roller shades.

BRIEF DESCRIPTION OF THE DRAWINGS

The above and other objects and features of the embodiments will become apparent and more readily appreciated from the following description of the embodiments with reference to the following figures, Different aspects of the embodiments are illustrated in reference figures of the drawings. It is intended that the embodiments and figures disclosed herein are to be considered to illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
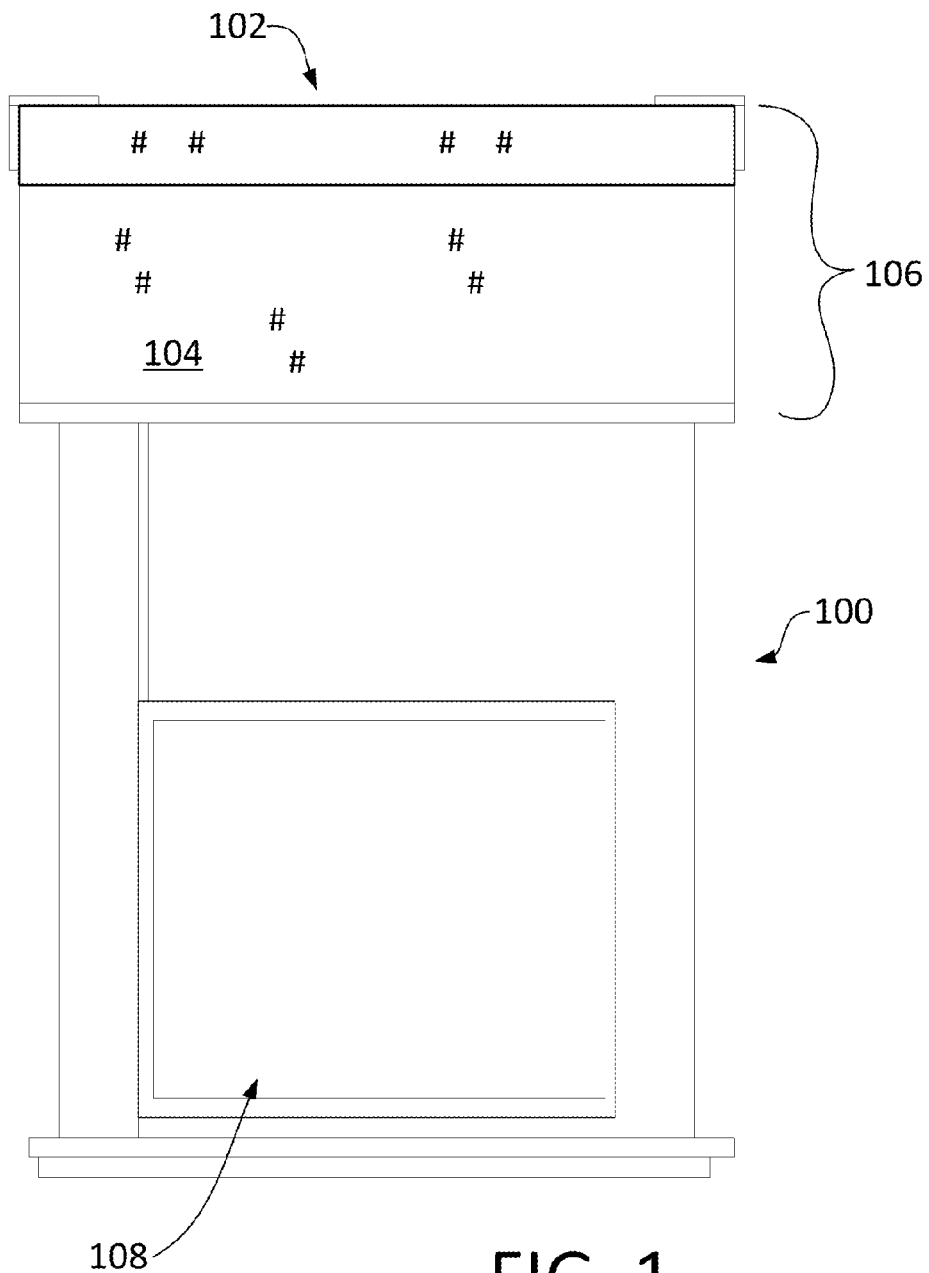

FIG. 1 illustrates a conventional motorized roller shade covering a window.

Figure 2:
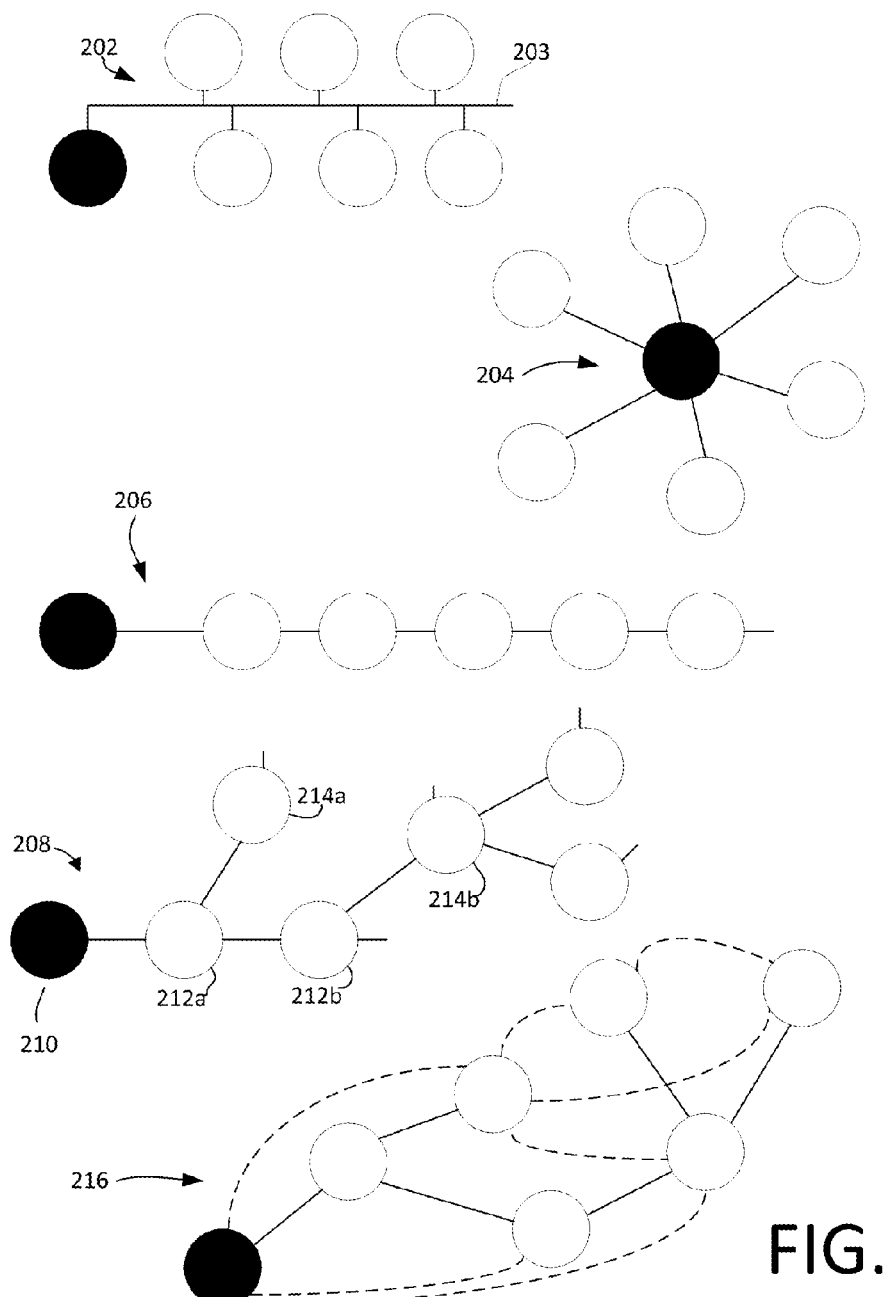

FIG. 2 illustrates various conventional computer data network topologies that may be suitable for connecting residential networks, such as shading, lighting, or combined shading and lighting devices.

Figure 3:
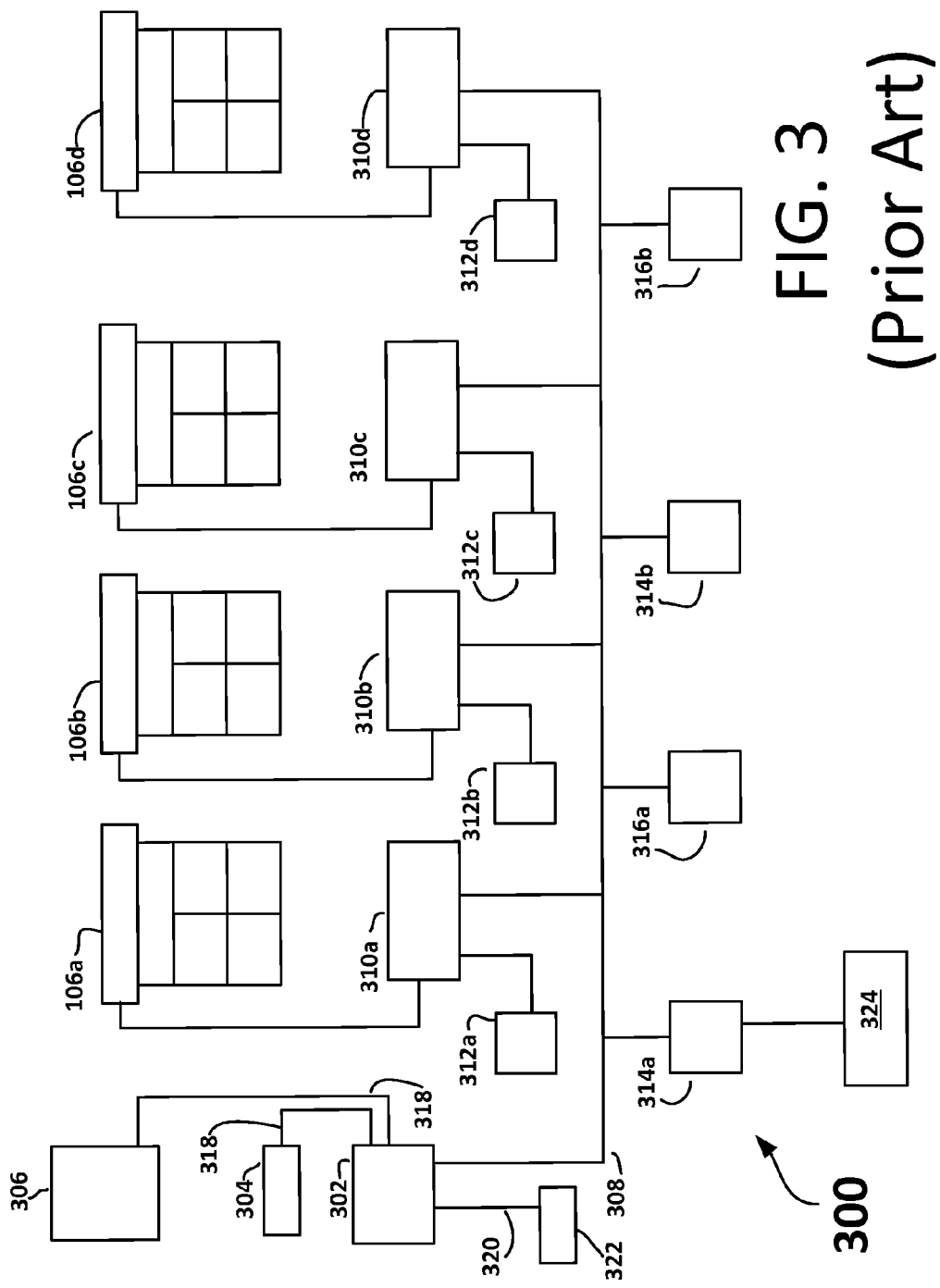

FIG. 3 illustrates a conventional automated combined shading and lighting control network system that is suitable for use in, among other places, a hotel suite, for controlling motorized roller shades, lighting, televisions, among other devices.

Figure 4:
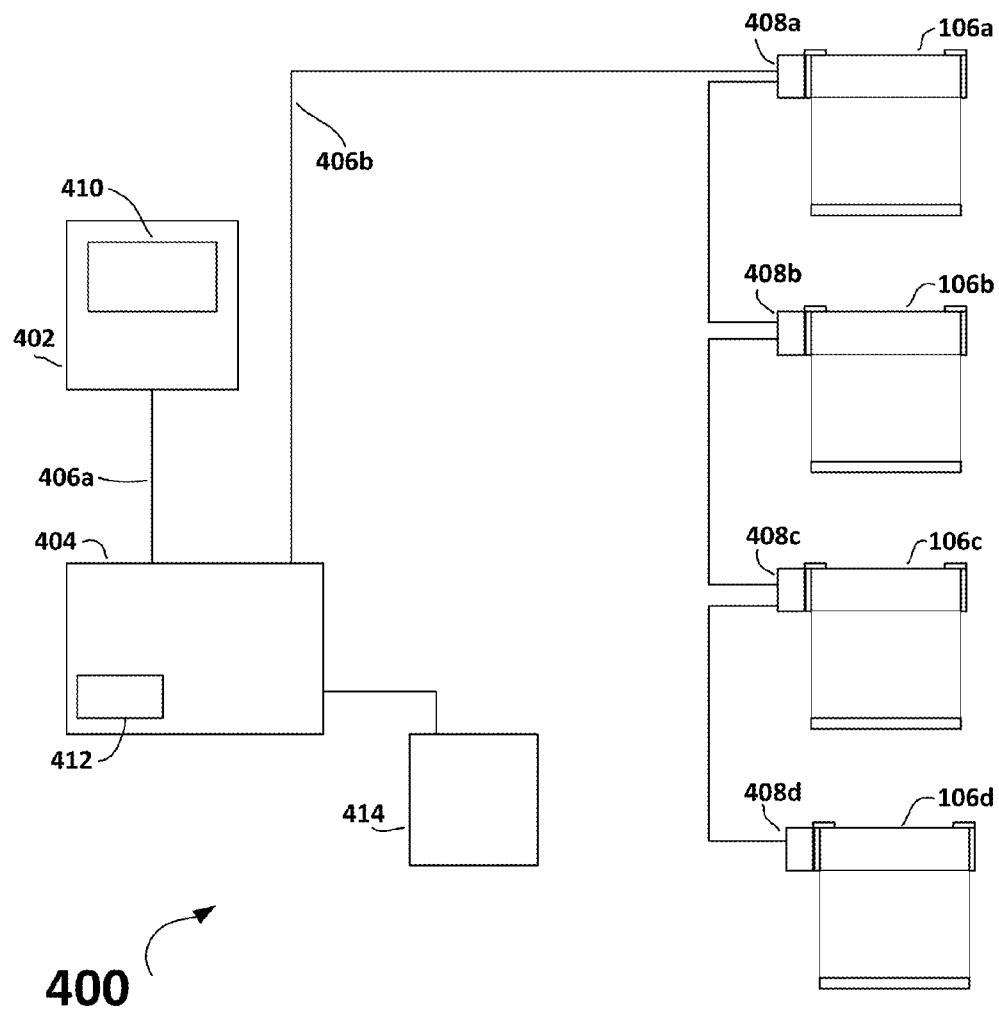

FIG. 4 illustrates a shading control network comprising motorized shades including electronic drive units configured in a daisy-chain network topology according to an embodiment.

Figure 5:
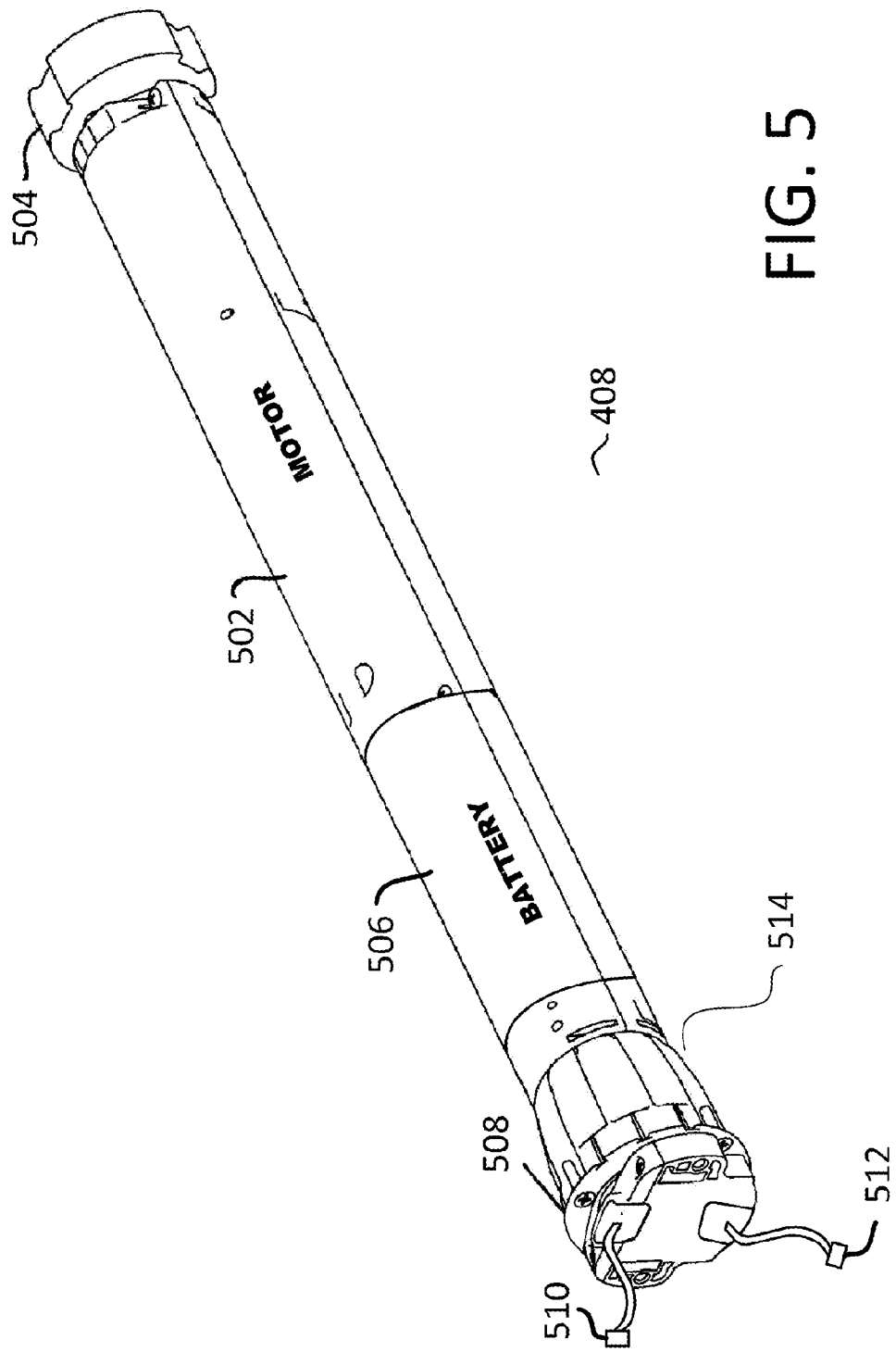

FIG. 5 illustrates a block diagram of the electronic drive unit of FIG. 4 and certain components thereof according to an embodiment.

Figure 6:
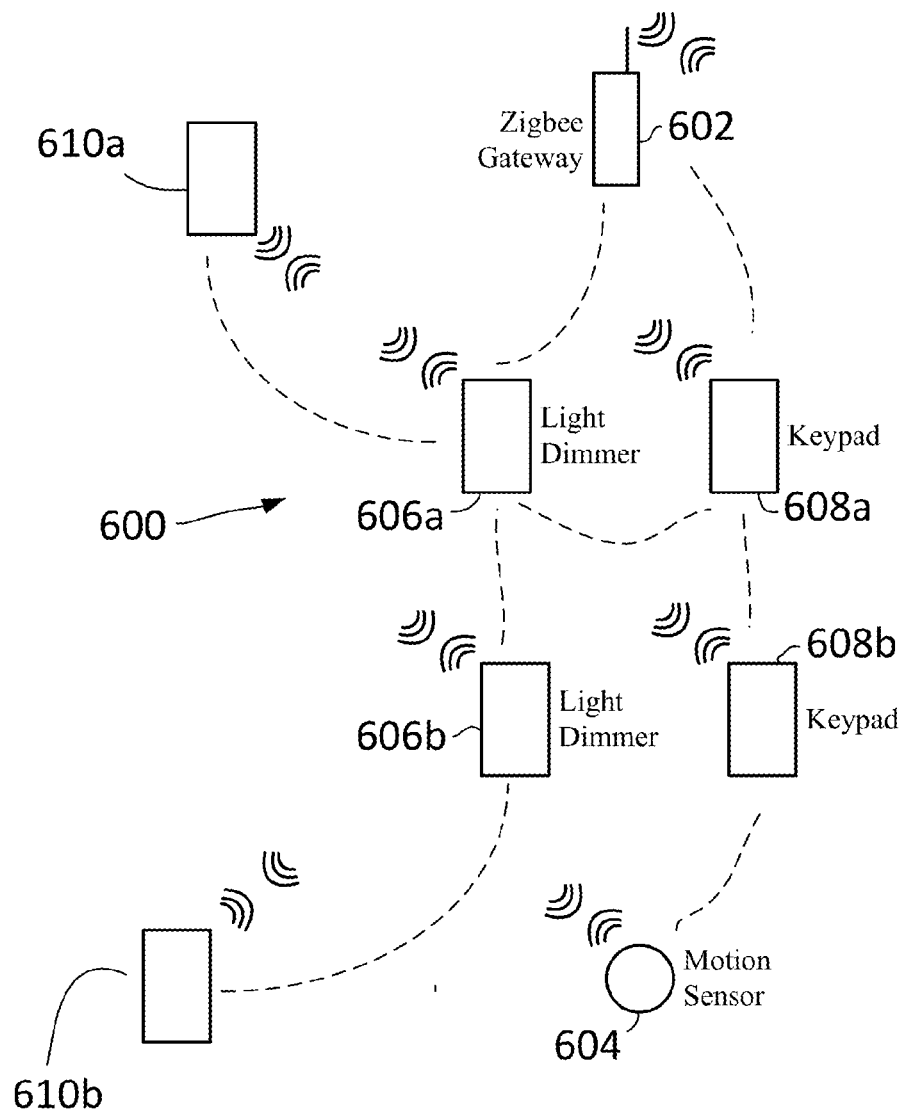

FIG. 6 illustrates a lighting control network comprising light dimmers and keypads configured in a mesh network topology and suitable for use within an overall home automation system according to an embodiment.

Figure 7:
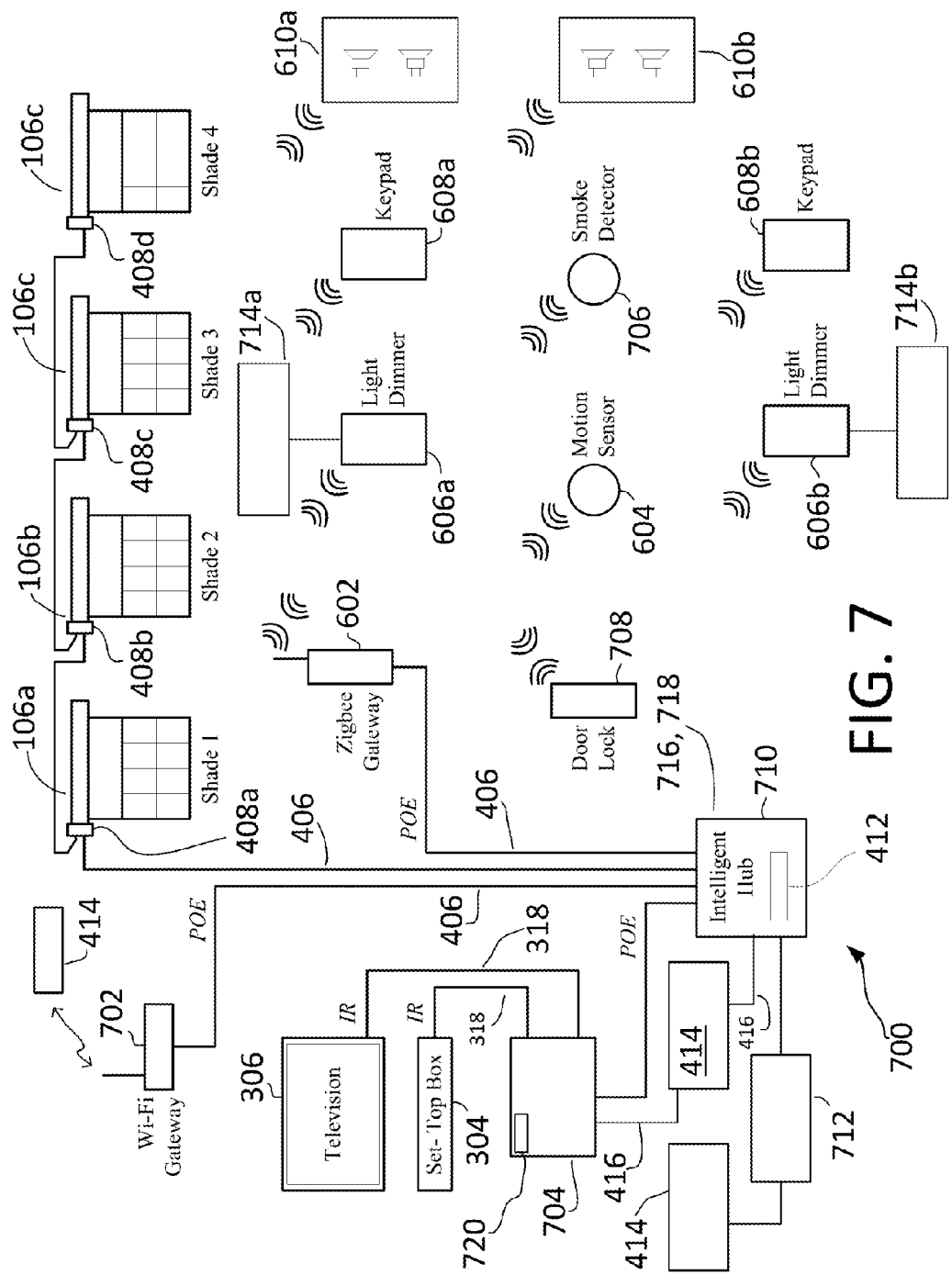

FIG. 7 illustrates a combined shading and lighting room automation control system that includes a shade control network configured in a daisy-chain network topology, a light control network configured in a mesh network, and an intelligent hub configured in a star network according to an embodiment.

Figure 8:
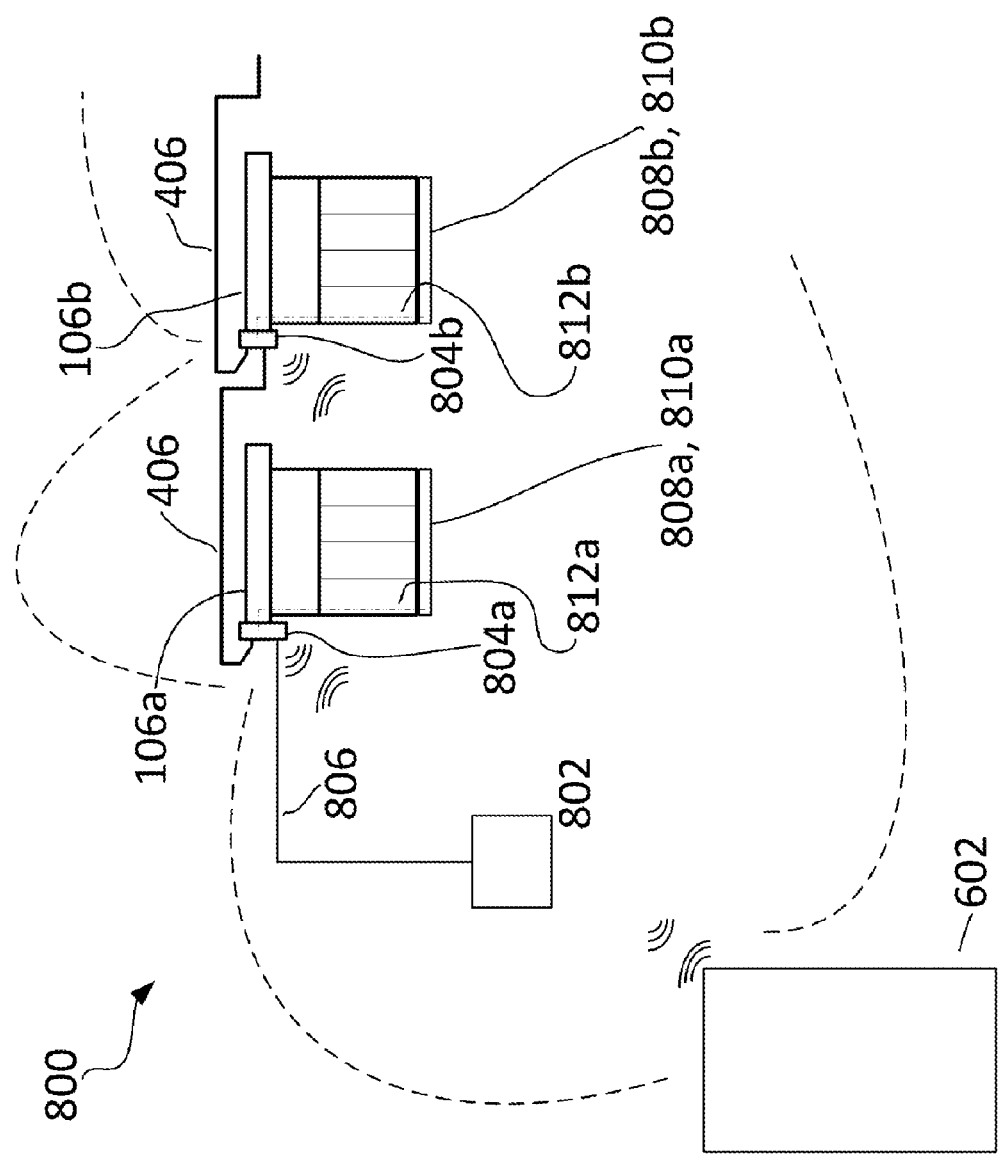

FIG. 8 illustrates a partial view of a combined shading and lighting room automation control system similar to that of the system of FIG. 7 that includes a shading control network configured in a daisy-chain network topology, a lighting control network configured in a mesh network, and an intelligent hub configured in a star network according to a further embodiment.

Figure 9:
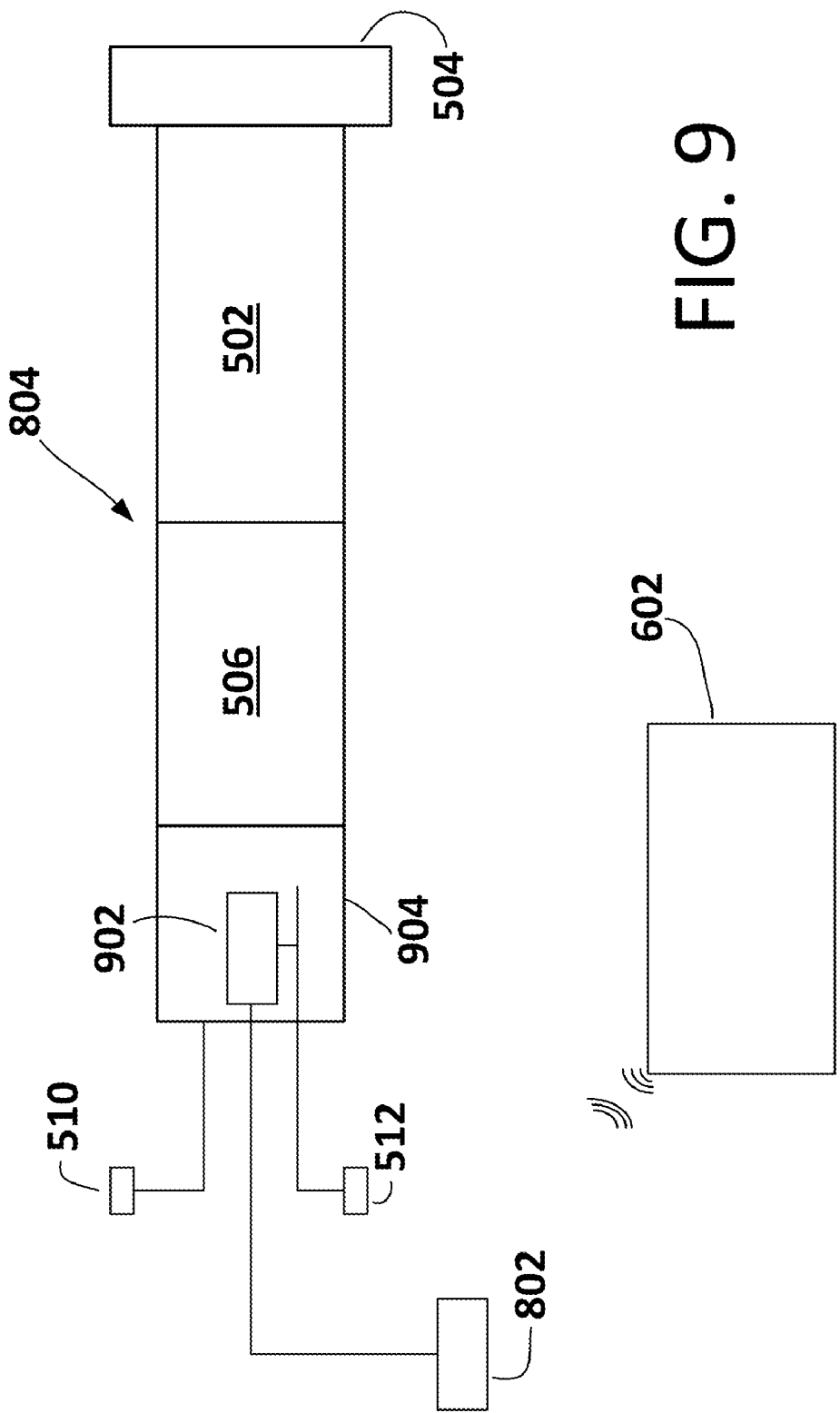

FIG. 9 illustrates a block diagram of an electronic drive unit of FIG. 8 and certain components thereof according to an embodiment.

Figure 10:
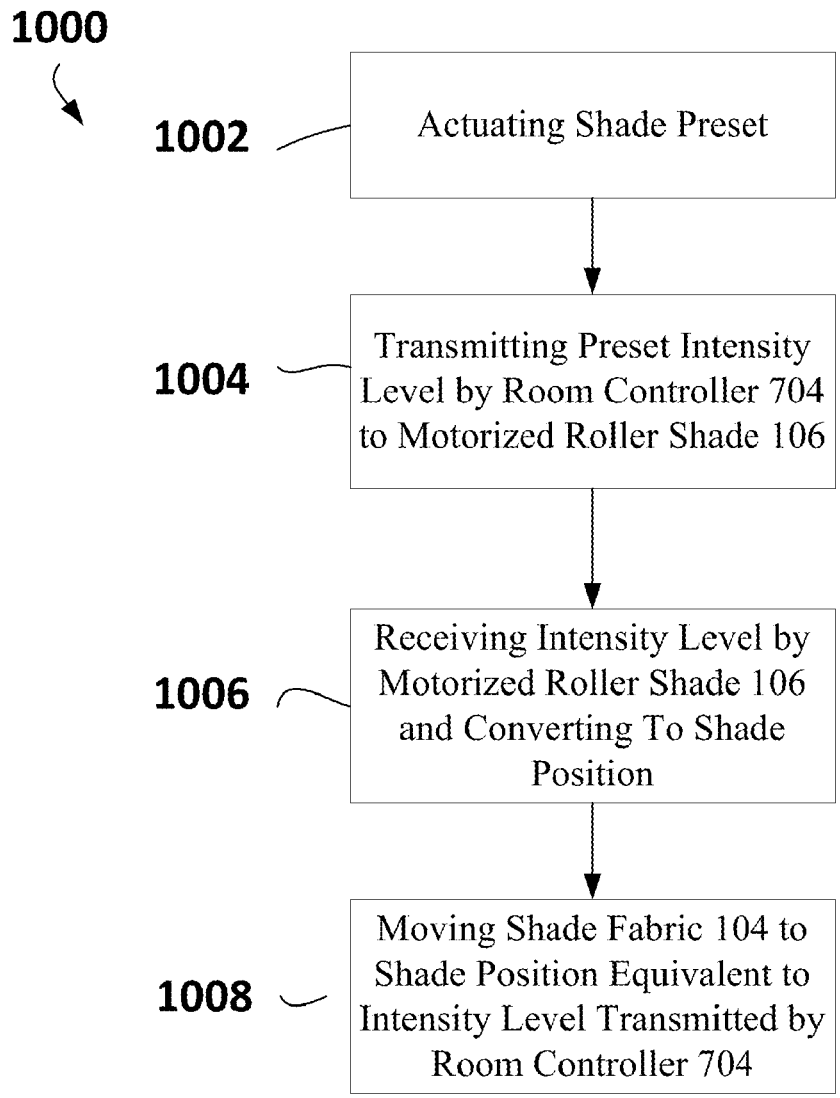

FIG. 10 is a flowchart of a method for controlling motorized roller shades by transmitting intensity levels from a room controller to one or more of a plurality of motorized roller shades according to an embodiment.

Figure 11:
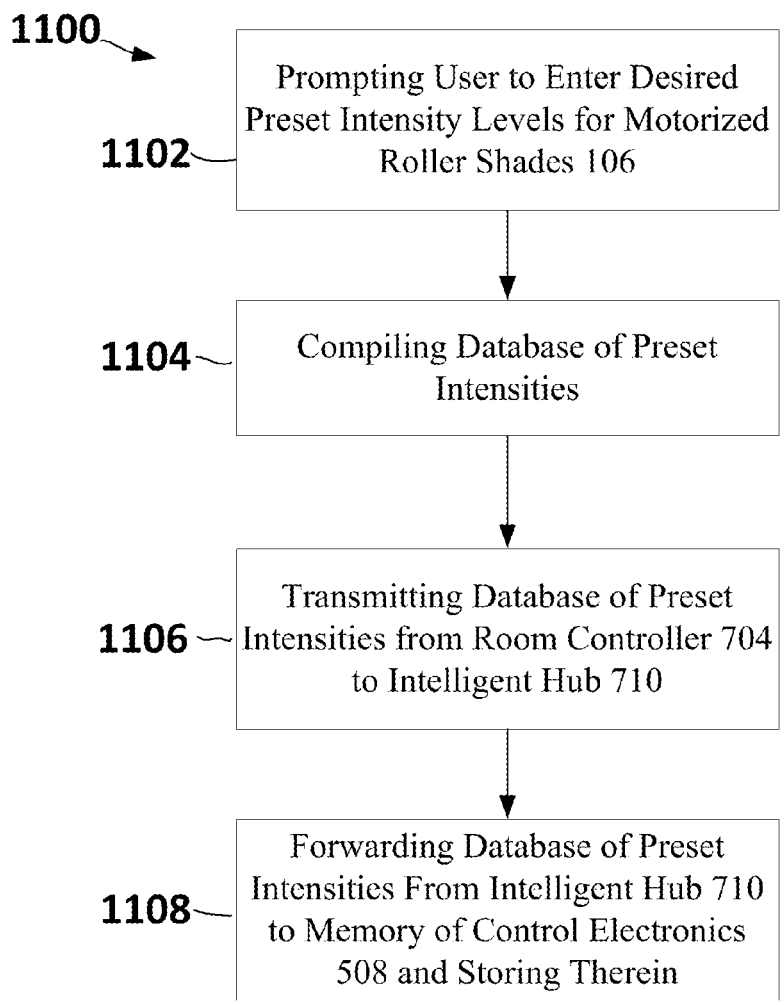

FIG. 11 is a flowchart of a method for storing preset intensity levels at one or more of a plurality of motorized roller shades according to an embodiment.

Figure 12:
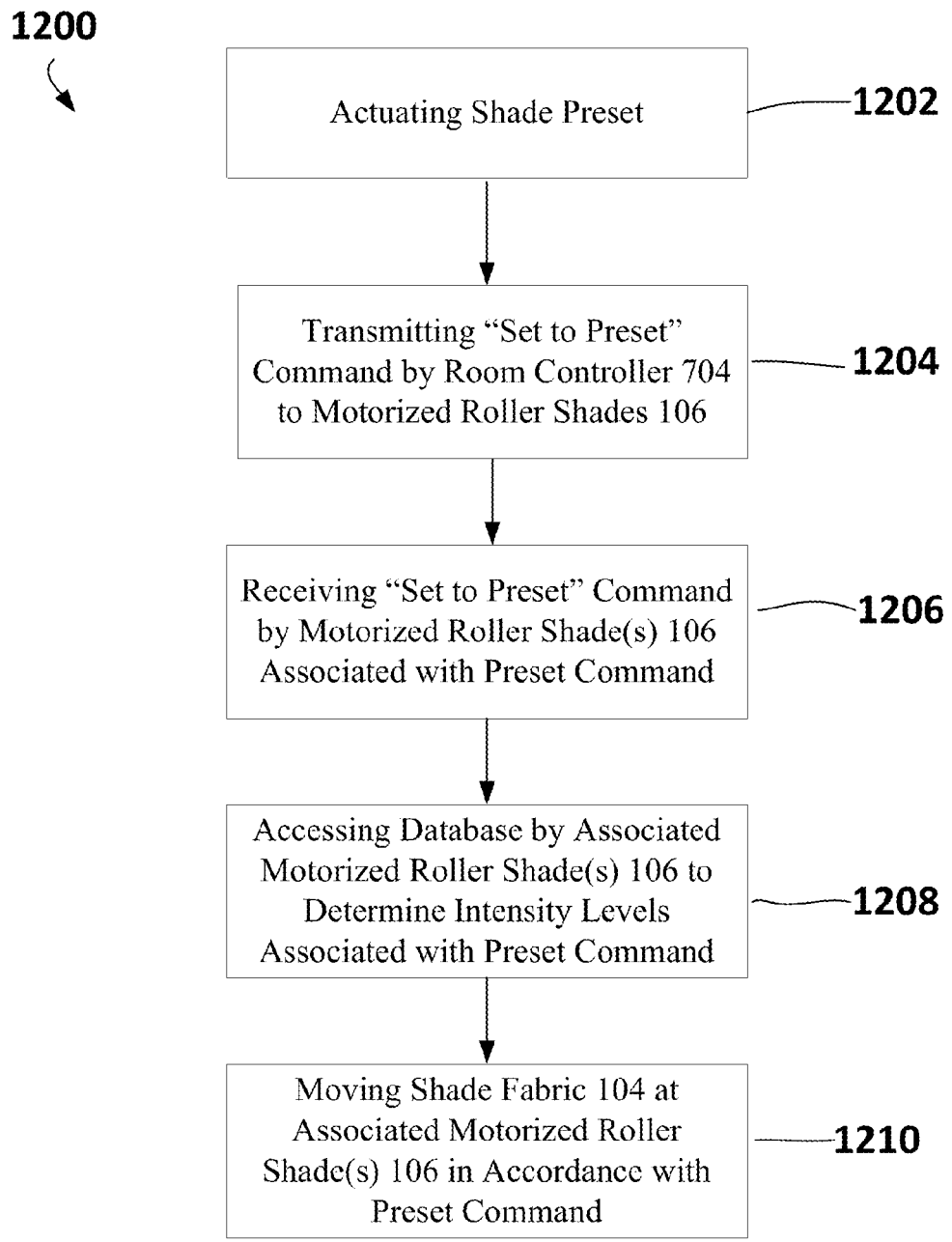

FIG. 12 is a flowchart of a method for controlling one or more of a plurality of motorized roller shades by transmitting a "set to preset" command from a room controller to at least one of the plurality of the motorized roller shades according to an embodiment.

Figure 13:
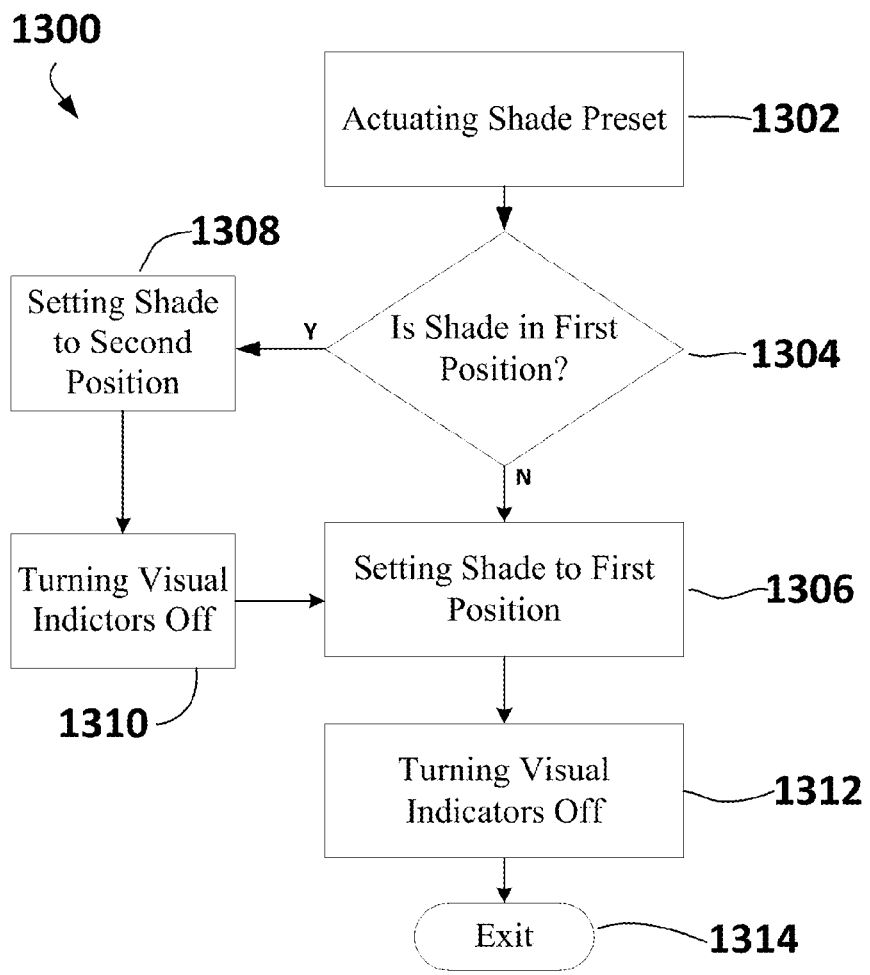

FIG. 13 is a flowchart of a method for toggling the position of at least one or a plurality of motorized roller shades between two preset positions in response to an actuation of a shade preset actuator according to an embodiment.

Figure 14:
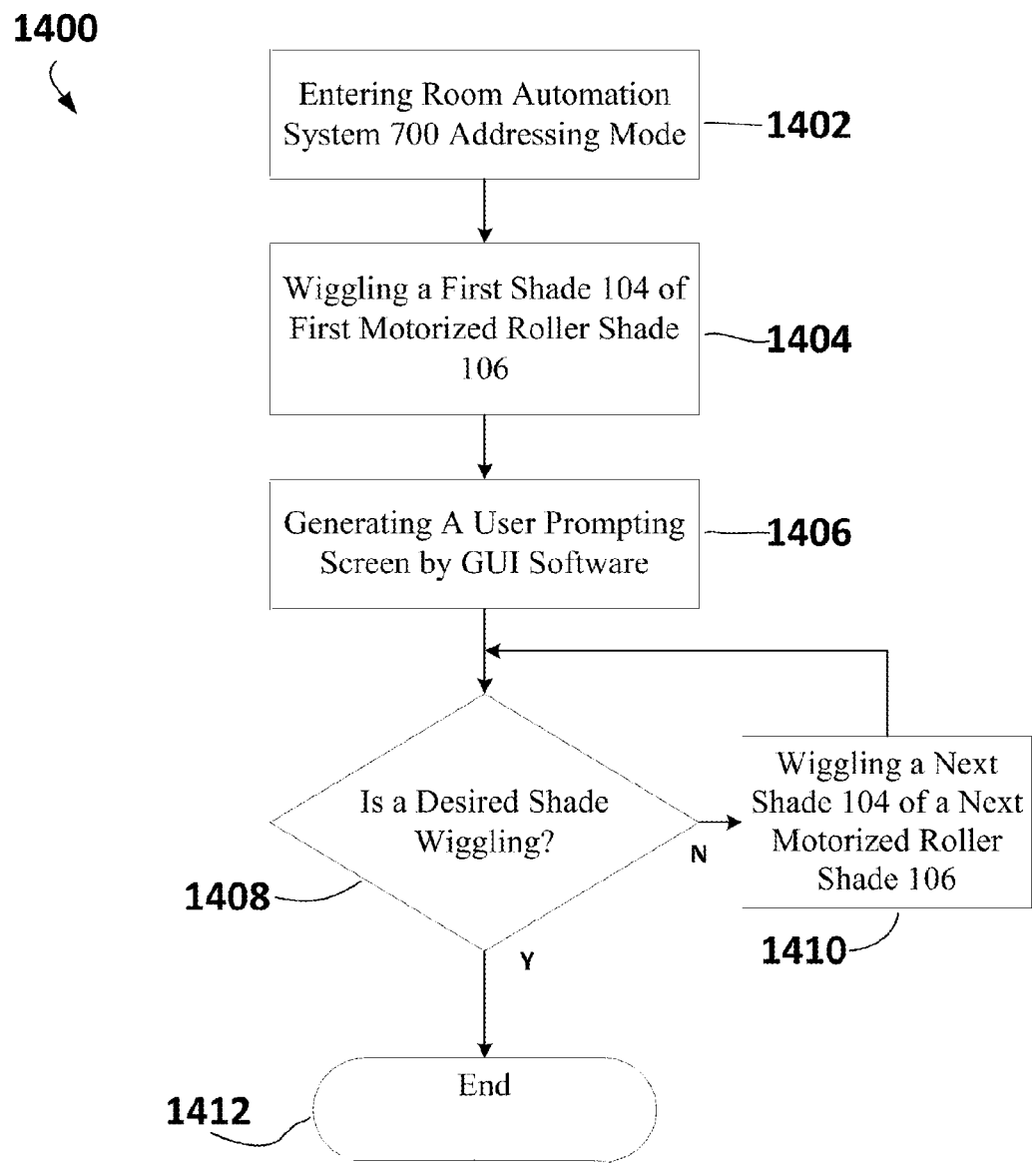

FIG. 14 is a flowchart of a method for visually identifying a particular motorized roller shade out of a plurality of motorized roller shades by the "wiggle" method according to an embodiment.

LIST OF REFERENCE NUMBERS FOR THE MAJOR ELEMENTS IN THE DRAWINGS

The following is a list of the major elements in the drawings in numerical order.
102 Roller Tube
104 Shade Fabric
106 Motorized Roller Shade (Shade)
108 Window
202 Bus Network Topology
204 Star Network Topology
206 Daisy-chain Network Topology
208 Tree Network Topology
210 Root Node 212 First Lower Level Node
214 Second Lower Level Node
216 Mesh Network Topology
300 Combined Shading and Lighting Control Network System
302 Room Controller
304 Set-top Box
306 Television
308 Bus (RS-485/Cresnet)
310 Interface Unit
312 Transformer
314 Light Dimmer
316 Keypad
318 Infra-red Signals
320 Ethernet (CAT5) Cable
322 Wide Area Network (WAN)/Local Area Network (LAN)
324 Lighting
326 Electronic Data Unit
400 Shading Control Network (Control Network)
402 Room Controller With Integrated Display (House Controller)
404 Intelligent Hub
406 Power-Over Ethernet Cable
408 Electronic Drive Unit
410 Room Controller Integrated Display
412 Power-over-Ethernet Power Supply
414 Computer, Laptop, Tablet, Server, Personal Computer (PC)
416 Universal Serial Bus (USB) Cable
502 Elongated Motor
504 Bearing
506 Battery
508 Control Electronics
510 Input Communication/Power Interface (Input Interface)
512 Output Communication/Power Interface (Output Interface)
514 Relay/Switch Network
600 Wireless Lighting Control Network (Lighting Control Network)
602 Zigbee Gateway
604 Motion Sensor
606 Wireless Light Dimmer
608 Wireless Keypad
610 Speakers
700 Combined Shading and Lighting Room Automation Control System (Room Automation System)
702 Wi-Fi Gateway
704 Hotel Room Controller (Room Controller)
706 Wireless Smoke Detector
708 Wireless Door Lock
710 Intelligent Hub (POE and Zigbee)
712 Wide Area Network (WAN)
714 Lighting System (Lights)
716 Shade Control Network
718 Light Control Network
720 Timing Device (Time Clock)
800 Room Automation System (Second)
802 Transformer
804 Electronic Data Unit (Zigbee Network Node)
806 Power Cable
808 Hem Bar
810 Small Battery
812 Trickle Charge Connector
814 Shade Control Network (Mesh and Daisy Chain; of Room Automation System 800)
902 Relay Network
904 Control Electronics (with Relay Network 902)

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as motorized roller shades.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Attention is now directed towards FIG. 4, which illustrates shading control network 400 that comprises motorized shades that include electronic drive units (EDUs) 408 configured in a star and daisy-chain network topology according to an embodiment. Shading control network 400 illustrates shades 106a-d (though those of skill in the art can appreciate that there can be more motorized shades, or less, and that four is simply a convenient number of shades to use for purposes of illustration only), where each of shades 106a-d includes corresponding electronic drive unit 408a-d, respectively.

Shading control system 400 further includes intelligent hub 404 and is configured in a star and daisy-chain mixed network topology. Intelligent hub 404 can be considered to be the "root node" and room controller 402 and first electronic data unit (EDU) 408a are the star nodes. The rest of the EDUs 408b-d are thereafter attached in a daisy-chain fashion to first EDU 408a. According to an embodiment, intelligent hub 404 provides electrical power to each node attached to it, either in the star network topology, or in the daisy chain network topology. The providing of electrical power by the Ethernet connections can be referred to as a power-over-Ethernet (POE) network. For example, room controller 402 with integrated display 410 receives its electrical power from intelligent hub 404. According to an embodiment, when using POE network protocols, the supplied electrical power can be 48 VDC, 12.95 watts maximum. As those of skill in the art can appreciate, these voltage and power levels are but examples, and not meant to be taken in a limiting manner; other voltages and/or power levels can be used dependent upon the circumstances and applications. Those of ordinary skill in the art can appreciate that networks that supply electrical power to devices, such as a POE network providing power to motorized roller shades 106 are not typically configured in daisy-chain topology 206 but are instead configured in star topology 204.

However, it is known to those of skill in the art that POE provides only a limited amount of power. The limited amount of power available from POE power supply 412 (about 12.95 watts) is not enough to drive even four motorized roller shades 106a-d simultaneously, let alone a dozen that could be in a large room. However, according to embodiments, it can be demonstrated that each of motorized roller shades 106a-d can operate at a very low duty cycle; that is, instead of continuously operating, shades 106 are typically in motion less than 5% of the time (i.e. less than 3 minutes per hour). According to further embodiments, this means that it is possible to put power storage, such as battery 506 (shown in FIG. 5), at each shade 106 and still keep the power draw requirements below the maximum capability of POE power supply 412.

With a daisy-chain network topology including power storage at each node (i.e., batteries 506 at each of motorized roller shades 106a-d), it is possible to conveniently wire each of motorized roller shades 106 in the daisy chain fashion, since each motorized roller shade 106 does not require "home run" wiring (i.e., wiring that goes from the respective motorized roller shade 106 to intelligent hub 404) back to a central node as it would with a star network topology. Also, supplying power over the same wiring as the data network eliminates the need to provide a dedicated electrical supply for power alone to each motorized roller shade 106. Those of skill in the art of residential home wiring can appreciate the disadvantage and additional work that would ensue if house mains AC power (e.g. 115 VAC) would have to be provided at each motorized roller shade 106.

As described above, shading control network 400 can be used not only in or as part of a home automation system, but can also be part of a much larger, integrated hotel suite. As those of skill in the art can appreciate, such a configuration can include additional devices to control, can be wired to larger networks such as a local area network (LAN), wide area network (WAN), or even the internet. The hotel suite configuration is described in greater detail in regard to FIGS. 6 and 7, below. In such a configuration the room side of intelligent hub 404 can be connected to room controller 402, as well as Wi-Fi gateway and a Zigbee gateway 62. It is known to those skilled in the art that the Wi-Fi and Zigbee wireless communication protocols conform to IEEE 802.11 and IEEE 802.14, respectively.

Attention is now directed to FIG. 5, which illustrates EDU 408 of FIG. 4 and certain components thereof according to an embodiment. As discussed above in the description of FIG. 4, one of the aspects of the embodiments is a daisy-chained topology shading network using power over Ethernet (POE) protocols. According to a further embodiment, the use of POE is facilitated by providing power storage at each of the network nodes, namely electronic drive units 408a-d, which correspond to each of the four controlled shades 106a-d. According to one non-limiting aspect of the embodiments, power storage can be in the form of battery 506.

Each electronic drive unit 408 includes an elongated motor 502 rotatingly driving a bearing 504. Bearing 504 is notched about its outer periphery to facilitate engagement between bearing 504 and an interior of roller tube 102 (shown in FIG. 1) in which elongated motor 502 is received. Each electronic drive unit 408 further includes battery 506 and control electronics 508 that are attached to motor 502 opposite bearing 504 such that control electronics 508 are positioned adjacent an end of roller tube 102.

Control electronics 508 of electronic drive unit 408 includes a microprocessor capable of monitoring the operation of elongated motor 502 to track the position of the associated shade fabric 104 as it is raised and lowered with respect to roller tube 102. Control electronics 508 also controls elongated motor 502 to adjust the position of shade fabric 104 in accordance with instructions from intelligent hub 404.

Each of electronic drive units 408 further includes input communications/power interface (input interface) 510, and output communications/power interface (output interface) 512. According to a further embodiment, each of the input and output interfaces 510, 512 can be an RJ45 type connector capable of receiving/transmitting not only control/data signals over an Ethernet cable, but can receive/feed-forward external power via POE network wiring (POE cables 406). As those of skill in the art can appreciate, the use of one type of connector or another is substantially immaterial, other than the connector must meet the minimum required electrical requirements for the transmission/reception of Ethernet data, and POE. According to an embodiment, input and output interfaces 510, 512 respectively, provide a POE wiring connection to provide power and communications transmissions for EDU 408, and according to another aspect of the embodiments, the provided power is used by control electronics 508 to trickle-charge battery 506.

According to further embodiments, input interface 508b receives power and data from a preceding EDU 408a, or intelligent hub 710, and output interface 508b feeds the power and data forward to a next motorized roller shade 106c/EDU 408c (i.e., power and data are transmitted from intelligent hub 710 to first motorized roller shade 106a/EDU 408a/input interface 510a, which then transmits the same power and data lines via output interface 512a and POE cables 406 to second motorized roller shade 106b/EDU 408b/input interface 510b).

According to a further embodiment, relays can be included in control electronics 508, such as one or more relay or switch (relay) networks 514. Relay network 514 provides the capability of switching power received by POE cable 406 from a first EDU 408 to subsequent EDU 408' as needed by battery 506. If, for example, it is determined that one or more batteries 506 needs recharging, then during quiet times, when no operation of motorized roller shades 106 is expected or anticipated, power can be provided by POE cable 406 to the particular battery 506 in need of recharging, and any other EDUs connected thereto via POE cable 406 can be completely disconnected from POE cable 406 thereby directing all the available re-charging current that can be carried by POE cable 406 to the particular battery or batteries 506 that need to be recharged. If instructions are received by any of room controller 704 and intelligent hub 710, the recharging can be interrupted, relays re-configured to allow power to flow again to the electronics within all of control electronics 508, and operation of room automation system 700 can proceed. According to further aspects of the embodiments, one or more batteries 506 of room automation system 700 can be recharged at substantially the same time.

According to a further embodiment, relay network 514 can also be used to extract energy stored in a first battery 506 and use it to charge a second battery 506. As those of skill in the art can appreciate, a battery that has been discharged will lose potential, or battery voltage, and a second battery at a higher potential or voltage can be used to transfer energy stored in it to the first one that is more discharged. Once the battery voltages are about the same, transfer of energy and re-charging will stop. As those of skill in the art can further appreciate, there can be instances wherein a first battery will lose its capacity to recharge fully over time, and will therefore discharge to a lower voltage state faster than other batteries, and will need to be re-charged more often. According to an embodiment, this mode of re-charging batteries 506 through the use of relay network 514 can be referred to as a "vampire mode" of re-charging.

Referring back to FIG. 4, according to an aspect of the embodiments, intelligent hub 404 acts as an interface between EDUs 408 of respective shades 106 and a home automation system that includes certain components, such as room controller 402. As those of skill in the art can appreciate, home automation systems can be quite complex, including, but not limited to, the control of audio and video distribution, lighting, shades and drapes, heating/ventilation/air conditioning (HVAC), and security subsystems, among other devices. As shown in FIG. 4, intelligent hub 404 resides between room controller 402 (which can be referred to more generally as simply "house controller") and motorized roller shades 106. Intelligent hub 404, and the components attached thereto, are substantially configured in a star topology; however each shade 106 is wired back to intelligent hub 404 in a daisy-chain topology and intelligent hub 404 provides power to each of shades 106, using for example, POE. Those of skill in the art can appreciate that other devices, such as audio speakers, can also be connected to POE intelligent hub 404 and "home-runned" back to this hub.

Control electronics 508 for shade 106 also acts as a communications hub, rebroadcasting data received from house controller 402 to other shades 106 that are daisy-chained together using POE cable 406. Further, each control electronics 508 of respective shades 106 receives and transmits back to house controller 402 data received from motorized roller shades further down the daisy-chain line. For example, as shown in FIG. 4, control electronics 508d of EDU 408d of shade 106d sends data pertaining to motorized roller shade 106d to control electronics 508c of EDU 408c of shade 106c, which then sends the data pertaining to shade 106d to control electronics 508b of EDU 408b of shade 106b, and so on back to house controller 402, through to intelligent hub 404. This allows longer lengths of wire (POE cable 406) to be used since the data/command signals are essentially received, amplified, and re-transmitted at each EDU 408.

Communication from downstream shades 106 back to house controller 402 are handled on a first-to-respond basis, i.e. the first link to receive data is assigned as the input, and the data received is broadcast out to all other links including house controller 402. Once communication has ceased, the link is relinquished, and the link waits for data to come in from any other shade 106 or control network 400 sub-system. Additionally, communication faults on a shade link 406, such as a short-to-ground, can be detected and isolated, preventing a failed shade device from suppressing communications elsewhere on control network 400. Failures such as this can occur due to a miswire of data lines, failure of transceiver hardware, or improper operation of communication software within shade 106.

Control electronics 508 of each shade 106 further provides for basic manual user controls to cause its respective shade 106 to open and close, or to be raised and lowered. This allows control by a user of the system prior to addressing and programming control network 400, or in the event of a failure of control network 400. Control electronics 508 of each shade 106 further provides a diagnostic feature to detect wiring faults. The diagnostic test can be initiated by the installer from a test button, or initiated remotely, via the internet, or local network control. Shades 106 downstream can be queried and the voltage levels of their response analyzed and stored. A data table can be built of all shades 106 (or other devices that might be controlled by house controller 402) that pass or fail the test(s), and store the voltage levels in a manner that is known to those of skill in the art. The results of the test can be displayed on integrated display 410 of house controller 402, or through use of light emitting diodes (LED) (or other visual indicators) at control electronics 508, and still further by wiggling shades 106 up and down to indicate success of the test. Shades that do not move can be considered to have failed the test. The cause of the failure can be indicated in the form of an LED blink pattern, or displayed in different ways on integrated display 410. The results can also be received and stored by house controller 402 and/or intelligent hub 404, and can further be transmitted to an external computer 414 (which can also be referred to as a personal computer (PC), and which further includes a server, laptop, tablet, or other portable/non-portable computer device that includes one or more processors, and other equipment/devices known by those of skill in the art) connected by universal serial bus (USB) cable 416 or other means (e.g., wireless 802.11 or other transmission protocols).

According to further embodiments, control electronics 508 provides the ability to report its own status to control network 400. The status reported can include information such as blown fuses, communication faults, the identification (ID) or serial number of the shade 106 connected to the respective control electronic 508, power consumption of control electronics 508, power consumption of motor 502, and battery 506 statistics (e.g., current voltage, maximum and minimum charged/discharged voltage, number of charge/discharge cycles, among other battery statistical data).

FIG. 6 depicts a lighting control network 600 comprising light dimmers 606 and keypads 608 configured in a mesh network topology and suitable for use within an home automation system according to an embodiment. Not shown, but understood to be included, are lighting loads 324. Lighting control network 600 can be used in conjunction with control network 400 in a home environment, hotel environment, or other commercial space, as discussed in greater detail below. Lighting control network 600 further includes Zigbee gateway 602 (which is essentially a low-power, low-data rate wireless modem/router) and motion sensors 604.

As discussed above, mesh networks are wireless networks that allow devices to communicate between the device and a central hub (Zigbee gateway 602), and between the device and one or more other devices in such a manner as to have substantially complete data transmission redundancy. In this manner, communications capability is very robust, as there are inherently several paths in which the data/commands that are desired to be communicated can do so. Thus, in the configuration shown in FIG. 6, which, as those of skill in the art can appreciate, contains only a few devices to illustrate the principles of operation, communications can exist between Zigbee gateway 602 and keypad 608a and light dimmer 606a. Light dimmer 606a can communicate to either or both keypad 608a and light dimmer 606b, Zigbee gateway 602, and speakers 610; keypad 608b can communicate to both keypad 608a and motion sensor 604. If any one of the devices exhibits a failure, because of the redundancy built into the lighting control network 600 using mesh network technology, the commands/data can still at least try a second path to arrive at their proper destination. Also shown in FIG. 6 are speakers 610, which can also communicate with Zigbee gateway 602.

As those of skill in the art can appreciate, lighting control system 600 with use of mesh network technology can encompass many other devices. In that case, instead of having each device being capable of communicating with two devices, multiple devices—three, four, or even more—can be communicated with by each device. Of course, providing for wireless communications over multiple redundant paths can increase costs, but it does make the system more robust, and also allows for higher data throughput.

FIG. 7 depicts combined shading and lighting room automation control system (room automation system) 700 that includes a shading control network configured in a daisy-chain network topology, a lighting control network configured in a mesh network, and an intelligent hub configured in a star network, for use as a system suitable for control of a hotel suite, or one or more rooms in a private suite according to an embodiment. Room automation system 700 incorporates control network 400, which includes POE interconnections between intelligent hub 404 and EDUs 408 of each or shades 106. In addition, intelligent hub 710 is connected via POE cables 406 to Wi-Fi gateway 702, which allows for communications to PC 414 wirelessly (which can be, as those of skill in the art can appreciate, personal computers/laptops or a central server), or to PC 414 via a wired connection (USB cable 416, or via WAN 712). In this manner, a user can use their PC 414, with specialized software or other applications (Apps) to control the shading and lighting within the room, wherever the room is located (hotel, home, or other commercial space). Intelligent hub 710 is substantially similar to that of intelligent hub 404, the main difference being, according to embodiments, that intelligent hub 710 contains additional software/programming capabilities not present in intelligent hub 404 that make it capable of communicating with room controller 704, Wi-Fi gateway 702, WAN 712, and Zigbee gateway 602, and controlling room automation system 700.

Intelligent hub 710 is further connected via POE cables 406 to room controller 704, and WAN 710. Room controller 704 is connected, via infrared communications, to set-top box 304 and television 306, and is further connected to all of the other devices within the room as shown in FIG. 7 through either a wired connection, i.e., POE cable 406 (including, for example, EDU 408), or through a wireless connection, via Zigbee gateway 602. As those of skill in the art can appreciate, other wireless means exist for communicating in a fashion similar to Zigbee, but few provide the combination of affordability and performance. Room controller 704 provides the main interface according to an embodiment between external control systems, such as front desk control system in a hotel environment, and the individual systems/devices within the room as shown in FIG. 7. Room controller 704 can further include a timing function, i.e., timing device 720, for use in setting and executing stored settings and pre-programmed functions and operations. In addition, as discussed in greater detail below, keypad 608 can assume at least some of the functions of room controller 704, and so in some circumstances can be interchangeable. However, for purposes of this discussion, reference will only be made to room controller 704 as being capable of controlling all of the devices within the room shown in FIG. 7, and further the only device capable of bi-directional communications with external control systems per Wi-Fi gateway 702 and WAN 712.

WAN 712 allows for interconnection to other servers and computers (not shown) that, especially in use in a commercial and/or hotel environment, allows for remote monitoring and/or control of the operations of room automation system 700. For purposes of example only, if room automation system 700 was located in a large meeting hall, for example a large convention center, then it could be advantageous to remotely monitor and/or control operations therein as such rooms are very expensive to rent or lease, and the control of the lights, shades and other similar apparatus can be very important not only to the occupants but the owners in terms of security, energy costs, and other concerns.

In terms of a home environment, WAN 712 and Wi-Fi gateway 702 allows for interconnection with the internet that allows for remote monitoring and/or control by a user or owner. Such remote operational capabilities provides for enhanced security, and conservation of resources. A user or owner can even control lighting and shades 106 by an App on their cell phone (e.g., 3G/4G (long term evolution (LTE) "smart phone") or other remote, personal communications devices; such operation can make it look like one or more people are in the house, when in reality the owners/occupants could be hundreds or thousands of miles away. To effectuate such command and control, intelligent hub 710 can be connected to Zigbee gateway 602.

As those of skill in the art can appreciate, Zigbee gateway 602 is but just one of a plurality of devices that can be used for low power, low data rate communications between intelligent hub 710 and shading/lighting and other types of devices 604, 606, 608, 610, 706, and 708. Each of these will be discussed in turn.

Through use of room controller 704, a user can be notified of detection of a person via motion sensor 604, or, room automation system can be programmed to turn on certain one or more lights if detection of a person and/or movement occurs. This, of course, can provide additional security. If it is thought that no one should be in the room, then additional security measures can be taken, again via programming of room automation system 700, to alert an alarm company as well as the owner or user.

Through use of room controller 704, an owner/operator can control lights via light dimmer 606. Light dimmer 606, as discussed in regard to FIG. 6, can communicate wirelessly with Zigbee gateway 602, and receive/send commands/data there-between. This allows the owner/operator to control the lighting instantaneously, or via a programmed setting (i.e., turn the lights on full at 5:15 PM, then dim them at 10:30 PM, then turn them off at 02:00 AM, and so on).

Room controller 704 and intelligent hub 710 can also communicate via POE cable 406 and wirelessly via Zigbee gateway 602 to wireless keypad (keypad) 608. Keypads 608 can be used for many different applications, and can be both inside and outside a room. Keypad 608 can be used to receive a code that allows entrance into a room through use of door lock 708; or keypad 608 can receive a temperature setting from an owner/occupant and have that information transferred to room controller 704 (which can then transfer that information to a combined heating/air conditioning unit (not shown)); keypad 608 can also receive notifications from the owner/occupant as to what lights to illuminate, and at what brightness setting, and also open or close shades 106. As those of skill in the art can appreciate, there are numerous other uses of keypad 608 that are made easier and more productive via use of wireless communications with Zigbee gateway 602, intelligent hub 710, and room controller 704.

Smoke detectors (hereinafter generally referred to as "detectors"; the detectors can be smoke, fire, carbon monoxide, pathogen(s), nuclear, and other bio-hazard type detectors) 706, while not generally requiring or providing much user interface or controllability, can communicate to room controller 704 via wireless communications through Zigbee gateway 602, and can further communicate to a central control/monitoring system (not shown) that would be interested in the event of any one or more of the different types of detections. In addition, the same systems can communicate with detectors 706 to ascertain their state of readiness, and to provide false alarms to test the responsiveness of personal in different buildings and/or rooms.

Wireless door lock (door lock) 708 can receive wireless commands from intelligent hub 710 that have been transferred to it via either/both WAN 712 and Wi-Fi 702; these commands can originate from a central control system, such as front desk in a hotel environment, and which provide control information such as a resettable lock combination (i.e., a resettable code), or to accept a certain programmed key card that are now ubiquitously used in hotels. Door lock can receive the encoded information from a programmable key card via keypad 608, or can receive a universal override code that might allow the management of the hotel facility to open any door. Further, door lock 708 can report failed attempt (and successful ones) to enter the room.

Embodiments regarding how the above-described constructions can used to program room automation system 700 will now be discussed in greater detail. In general, the programming of motorized roller shades 106, as well as other components of room automation system 700 will include addressing each component of room automation system 700. The programming of room automation system 700 can also include setting open and close limits for each of electronic drive units (EDUs) 408 and assigning one or more EDUs 408 to respective room controllers 704 (it can be the case that in larger environments there could be multiple room controllers 704).

For proper operation of the above-described room automation system 700, each component included in room automation system 700 must be given a unique address identifier to distinguish the components of room automation system 700 from each other. As described above, room automation system 700 utilizes a communication network in which all of the system components are connected to either a common communications bus, POE cable 406, or wirelessly via Zigbee gateway 602. The use of POE cable 406 provides for "soft addressing" of the system components in which a unique address can be automatically assigned to each component when a user enters a "system configuration mode." As will be described below, the system configuration mode is used to address components and to assign EDUs 408 to room controllers 704. The system configuration mode can also be activated from any one of keypads 608, or from an alternate device or control system linked to room automation system 700 through Wi-Fi gateway 702 and/or WAN 712. However, as discussed above, in fulfillment of the dual purposes of clarity and brevity, reference shall only be made to system configuration with use of room controller 704.

Aspects of the embodiments provide for automatic addressing of system components, which results in each of the components having a unique address identifier associated with it. As those of the skill in the art can appreciate, however, the identifiers need not be assigned by room automation system 700 according to any particular series or pattern and could, for example, be accomplished by random numbering. It is only required that the address identifiers be unique such that room automation system 700 can distinguish one component of room automation system 700 from another.

Room automation system 700 according to embodiments provides for addressing of system components from room controllers 704 as follows. Room controller 704 is placed in "system configuration mode" by pressing and holding one or more pre-defined buttons, or via some other means. Following engagement of the system configuration mode button(s), an indicator will show that room controller 704 is ready to begin addressing room automation system 700. Another button or key (one of skill in the art can appreciate that these are but non-limiting examples, and that many different means are available, e.g., "soft keys" on a touch screen display, all of which should be considered within the aspects of the embodiments, for starting and starting different processes within room controller 704 and room automation system 700; in fulfillment of the dual purposes of clarity and brevity, reference shall be made from hereon in only to "buttons") is pressed to initiate automatic addressing by room controller 704 that then assigns a unique identifying address to each component of room automation system 700.

While the system components are being addressed by room controller 704, an indicator will show that each of the devices found are being addressed. When each device has been addressed, another indicator can show that the actions have been completed. This indicates that addressing is complete and that the "system configuration mode" can be exited, such as by pressing another button, or the same as was pressed to enter system configuration mode. According to further embodiments, room automation system 700 can also be configured to provide for exiting of the system configuration mode automatically once configuration has been completed.

In addition to providing a visual indication of various programming stages, indicators are available that show that room controller 704 also provides a confirmation of correct wiring of the room. Automatic addressing of the components of the shades can also be initiated via room controller 704 as follows. Pressing and holding a close limit button of room controller 704 for several seconds, for example, will place room controller 704 in a "ready to address" mode. Addressing of the shade system components by room controller 704 is then initiated by pressing another button, in this case, an adjustment button.

Control of the shades by room controller 704 according to embodiments is also programmable to set an "open limit" position and a "close limit" position for each of EDUs 408. These limits determine how far the associated shade fabric 104 will travel when its respective EDU 408 is directed to drive shade fabric 104 to the full open or full close positions. The shade limit positions can be set for EDU 408 using room controller 704 as follows. Pressing an open limit button of room controller 704 actuates a "set open limit" for that EDU 408 and an adjustment button room controller 704 can then be used to move the associated shade fabric 104 to the desired full open position. With shade fabric 104 in the desired position, the user presses and holds an open limit button. An indicator will then show that the current position for the EDU 408 has been stored by room controller 704 as the open limit for that particular EDU and shade fabric 104. In a similar fashion, a close limit button of room controller 704 provides for setting the desired close limit position using adjustment buttons in a "set close limit mode" for the respective EDU 408. According to further embodiments, the open and close limits of different motorized roller shades 106 can also be set using the room's respective keypad 608 in a manner similar to that of room controller 704.

As described above, room automation system 700 according to embodiments utilizes a communication network in which each component of room automation system 700 is connected to one or more communications buses, as shown in FIG. 7. The physical communications' connections facilitates configuration, or reconfiguration, of room automation system 700 during various programming stages including system addressing, setting of EDU 408 limit positions and assignment of EDUs 408 to keypads 608. Construction of the communication network according to the embodiments described herein provides for troubleshooting and reporting of operational errors that may occur. As described above, signals directing control electronics 508 of electronic drive units 408 to move the associated shade fabrics 104 will be transmitted to EDUs 408 from room controller 704 at various times during operation and configuration of room automation system 700. In the event that an EDU 408 fails to move the associated motorized roller shade 106 in response to such a command, room controller 704 can be arranged to diagnose and report various failures or conditions that may be responsible. For example, room controller 704 could be arranged to check such a failing EDU 408 for hardware conditions including stalling of motor 502, overheating of motor 502, duty cycle and software problems including corrupted position data.

According to further embodiments, room controller 704 can be interrogated following failure of EDU 408 to respond for any systemic conditions, such as excess number of devices or duplication of component addresses for example. Following diagnosis of an EDU 408 failure to respond, room automation system 700 provided for error reporting to room controller 704 from which the command signal originated. Error reporting at the originating device can be achieved by various types of display(s), using various combination of on/off or flash rate lighting conditions of LEDs of the originating device. According to further embodiments, keypad 608 and/or room controller 704 can be modified to include a display (e.g., a liquid crystal display (LCD), LED display, among others) to report numbered codes at an originating device.

Room controller 704 according to embodiments has been described herein for configuring and operating multiple motorized roller shades 106 having internal motors 502 driving roller tube 102. Different aspects of the embodiments, however, are not so limited and can be used in other applications. For example, room controller 704 can be used to control shade rollers having external motors driving roller tubes. According to further embodiments, room controller 704 can also be applied to configure and operate other motor driven window treatments including roman shades and draperies, for example.

Room automation system 700 according to embodiments facilitates configuration of the different system components, in the manner described above for example for addressing, limit setting, and assignment. The communication network room automation system 700 also facilitates modification of an established network as described below, to facilitate replacement of a device or combination of multiple networks without requiring loss of programming for the established network.

As described above, room automation system 700 includes multiple motorized roller shades 106 each including EDU 408 connected to a rotatably supported roller tube 102 that windingly receives a flexible shade fabric 104. Room automation system 700 can also include other devices such as keypads 608 and room controllers 704 that can control EDUs 408 of motorized roller shades 106. Room controllers 704 control assigned motorized roller shades 106 by directing EDUs 408 to raise or lower the associated shade fabric 104 to a desired shade position or, alternatively, to move shade fabric 104 to a preset shade position stored in a memory. During initialization of room automation system 700 each room controller 704 is associated with one or more EDUs 408. This process is known as EDU assignment.

EDUs 408 of motorized roller shades 106, and room controller 704, of room automation system 700 are interconnected by POE cables 406 and/or Zigbee wireless communications. POE cables 406 provide for transmission of signals and power between intelligent hub 710 (which receives commands/data from room controller 704) and EDUs 408 for control of motorized roller shades 106 and for communication of network-related information.

The components and devices of the room automation system 700 are preferably interconnected such that each component or device can communicate with every other component or device on the network. A suitable shade network for use in the integrated control system according to embodiments is shown and described in regard to FIGS. 4-7. Each of EDUs 408 and room controller 704 can have memory storage capability to provide for storage at the respective device(s) of a database of information including network related information such as device addresses and EDU assignments, for example. As those of skill in the art can appreciate, it is not a requirement according to the embodiments to have such memory storage, but each device of room automation system 700 can be adapted for memory storage. According to further embodiments, room automation system 700 can further include one or more centralized devices capable of memory storage for storage of network related information at those locations instead of at EDUs 408 or room controller 704 of room automation system 700. In addition to motorized roller shades 106 and room controller 704, room automation system 700 can also further include other devices connected to room controller 704.

The term "fully-opened" as used herein should be understood as referring to a position for a motorized shading treatment that provides a minimum of light blockage for shading area, such as defined by a window for example, for which the shading treatment provides shading. The term "fully-closed" as used herein should be understood as referring to position for the motorized shading treatment that provides for maximum light blockage for the shading area by the shading treatment. In a similar manner, relative terms such as "half-opened" or "partially opened" should be understood in relation to the "fully-opened" or "fully-closed" positions for the shading treatment.

The lighting system of room automation system 700 includes dimmable loads, such as lamps, or lighting 714. In a manner similar to the motorized roller shades 106, the dimmable loads of lighting system 714 are interconnected in a network arrangement that provides for receipt of required power by the dimmable loads for lighting system 714. Lighting system 714 can also include light dimmers 606, each adapted for controlling one or more dimmable loads of lighting system 714. The use of room controller 704 and light dimmers 606 in room automation system 700 facilitates optional programming and operation of the motorized roller shades 106 and lights. According to further embodiments, integrated control of both motorized roller shades 106 and lights 714 controlled by light dimmer 606 from a centralized location is provided for by room automation system 700 as further discussed below.

Room automation system 700 includes room controller 704. As shown in FIG. 7, room controller 704 is connected to motorized roller shades 106 and other devices via POE cable 406 via intelligent hub 710 and Zigbee gateway 602, and is adapted for integrated control of all of the devices shown in FIG. 7. Room automation system 700 also includes keypads 608 connected to room automation system 700 for controlling either motorized roller shades 106 or the dimmable loads of lighting system 714 via light dimmers 606 from a single convenient location, such as a wall-mounted location for example.

Room controller 704 functions to transmit control signals, input at one of keypads 608, for example, to lighting system 714 and to direct lighting system 714 to modify the current delivered by dimmers 606. The current for the dimmable loads is set by room controller 704 and/or light dimmer 606 to a particular intensity level ranging between about 0 to about 100 percent in response to the command signal from room controller 704. The intensity levels for the dimmable loads of lighting system 714 can be raised and lowered by a user to a desired level or, alternatively, can be set to a preset intensity level programmed into room automation system 700 for the dimmable load.

Although not shown in detail, room controller 704 can include raise and lower actuators for respectively increasing or decreasing the intensity level for a dimmable load of lighting system 714 or for raising or lowering shade fabric 104 of motorized roller shade 106 in room automation system 700. Room controller 704 further can include a plurality of preset actuators for directing motorized roller shades 106 or the dimmable loads respectively, assigned to the actuator to a preset intensity level (or equivalent shade position) that has been programmed into room controller 704. Room controller 704 can also include visual indicators such as LEDs. The LEDs provide a visual feedback, for indicating to a user whether a dimmable load of the lighting system is on or off, for example, or whether motorized roller shade 106 is in a first or second preset position as described below in greater detail.

As described above, room controller 704 works within room automation system 700, and is configured to direct EDUs 408 of motorized roller shades 106 to raise or lower associated shade fabrics 104 to a desired shade position or to move motorized roller shades 106 to a preset shade position that has been programmed into memory storage. Room controller 704, as described in the preceding paragraphs, is adapted to direct signals representing intensity level, appropriate in use of lighting system 714 for controlling a dimmable load. To provide for control of motorized roller shades 106, commands representing intensity level can be converted into a shade position value more appropriate to a shade control system. Room controller 704 is further configured according to embodiments to convert the intensity level values transmitted from room controller 704, in response to user inputs, into shade position values such that an intensity level of about zero (0) percent is equivalent to a shade in a fully-closed position and an intensity level of about 100 percent is equivalent to a shade in a fully-opened position. In this manner, existing lighting control systems 714 can be modified into the an integrated control system as embodied by room automation system 700/room controller 704 capable of controlling motorized roller shades 106 and lights with only limited changes to the existing lighting system 714 being required.

As can be appreciated by those of skill in the art, keypads 608, light dimmers 606, lighting system 714, motion sensors 604, detectors 706, and room controller 704, can all be wall-mountable for installation in a convenient location that facilitates access to the different components of room automation system 700 by a user. According to further embodiments, however, those of skill in the art can appreciate that room automation system 700 can also include hand held infrared transmitters (not shown) generating infrared signals for receipt by an infrared receiver connected to different components of room automation system 700 including, but not limited to, set top box 304, television 306, keypads 608, light dimmers 606, lighting system 714, and room controller 704.

Those of skill in the art can appreciate that room controller 704 can be connected to PC 414 via Wi-Fi gateway 702 and/or WAN 712, as shown in FIG. 7. Connection of PC 414 to room controller 704 can also be accomplished via an interface through intelligent hub as shown in FIG. 7 through USB cable 416, or directly to room controller 704 by second USB cable 416. Connecting PC 414 to intelligent hub 710 provides for programming and control efficiencies through the use of graphical user interface (GUI) software running on PC 414. Such GUI software provides for screen displays and user selection prompts to facilitate system programming and other functions such as system diagnosis features for troubleshooting problems and installing new systems. Although PC 414, and the GUI software loaded thereon, may also facilitate normal operation of room controller 704 following installation or maintenance of room automation system 700, it is not required. According to additional embodiments, PC 414 can be connected to room controller 704 directly solely for the purpose of programming room controller 704 with the necessary information to provide for subsequent operation of room automation system 700 via room controller 704. Following completion of the required programming of room controller 704, therefore, PC 414 can be disconnected from room controller 704 for normal operation of room automation system 700 without PC 414.

In room automation system 700, room controller 704 can further include memory storage of system related information and for directing command signals relating to intensity levels to lighting 714 and motorized roller shades 106. As described above, PC 414 can be used to operate room automation system 700. PC 414 can be permanently included in room automation system 700 for use of the processor and memory storage capabilities of PC 414 instead of including room controller 704, according to further embodiments. The use of a separate room controller 704, as shown in several figures, however, provides for a more robust and durable construction for room automation system 700.

According to further embodiments, room automation system 700 can further include time clock 720 that is associated with room controller 704. Association of time clock 720 with room controller 704 provides for storage of time-based information in memory of room controller 704 regarding the position or condition of motorized roller shades 106 and the dimmable loads of lighting system 714. For motorized roller shades 106, for example, room controller 704 can store information regarding shade position of a given motorized roller shade 106 at a given time of day. Such time-based information regarding the motorized rollers shades 106 can then be used to create a macro program for directing all of, or only part of the set of motorized roller shades 106 to automatically move the given motorized roller shade 106 to certain shade positions at different times of day based on the historical time-based information stored in memory by room controller 704. Once the macro program has been created, a user in a residential setting for example could activate the program, when leaving on a vacation, to provide for automatic control of motorized roller shades 106 to mimic occupied use of the residence in accordance with the historical time-based information regarding motorized rollers shades 106 stored in memory by room controller 704.

As briefly discussed above, room controller 704 of room controller 700 can also be connected to a security system for the home or facility in which the room automation system is installed. Room controller 704 can also be programmed to set all of the dimmable loads of lighting system 714 to full intensity or to flash them rapidly, in response to an alert signal transmitted to room controller 704 by the security system. Room automation system 700 can also be programmed to move all of the motorized roller shades 106 to a fully-opened position, thereby maximizing the effect produced in an alert mode by the dimmable loads of the lighting system 714. Room automation system 700 can alternatively be programmed to move all or part of motorized roller shades 106 to their fully-opened positions and then to cycle between the fully-opened position and a partially closed position to provide an additional alert signal.

As shown in FIG. 7, room automation system 700 further includes intelligent hub 710 connected between room controller 704 and all of the other devices within the room or area controller by room automation system 700. Intelligent hub 710 further includes a buffer to store feedback information from motorized roller shades 106 regarding the position or condition of the motorized roller shades 106. The storage of the feedback information from motorized roller shades 106 by the buffer facilitates independent operation of motorized roller shades 106 from lighting system 714 for continued operation of either in the event of a failure of room controller 704, for example.

The inclusion of intelligent hub 710 having a buffer also facilitates conversion of an existing lighting control system into room automation system 700 capable of controlling lights and shades. In such a lighting control network system, such as that provided by Crestron's Cresnet®, a streaming protocol communication system can be utilized. In a communication system based on streaming protocol, packets of information are periodically transmitted between interconnected components. This form of communication is contrasted to an event-based protocol system of communication in which information is transmitted in response to an event, such as an input command via a keypad controller or feedback information following action by a component in response to a command (e.g., a motorized shade confirms movement in response to a command or indicates a failure condition).

A streaming protocol system provides for more flexibility in configuration of a control system, such as room automation system 700. This is particularly desirable in control systems where relatively inexpensive devices are controlled, such as in lighting control systems for example, because network information can be transmitted from a centralized location without the need for memory storage at each device. The buffer capabilities of intelligent hub 710 provides for modification of an existing lighting control system that uses a streaming protocol communication, to add a shade control system adapted to communicate based on an event-based protocol, with limited changes to the lighting control system being required.

According to further embodiments, there may be occasions where it is desirable to link a first established room automation system 700a with a second room automation system 700b separately established from first room automation system 700a. Such a situation could occur, for example, during construction or remodeling of a facility. The separately established room automation systems 700a,b can include separately addressed devices. Such a situation creates the possibility that a merger of the previously separate room automation systems 700a,b could result in multiple sets of devices sharing a common device address. To resolve the address conflict in conventional control systems, reprogramming of the conflicting devices, or of the entire system, is required. Reprogramming can be a time-consuming task, particularly where reprogramming of an entire system is required.

FIG. 8 illustrates a partial view of combined shading and lighting room automation control system (room automation system) 800 similar to that of the system of FIG. 7 that includes shade control network 814 configured in a combined mesh and daisy-chain network topology, light control network 718 configured in a mesh network, and intelligent hub 710 configured in a star network according to a further embodiment. FIG. 9 illustrates a block diagram of an electronic drive unit of FIG. 8 and certain components thereof according to an embodiment. While similar, there are substantive differences between room automation system 700 and room automation system 800 according to embodiments. One such different is wall transformer 802, which provides motor and battery re-charging power to motor 502 and battery 506, respectively, of EDU 804 (which, as its number implies, is different from EDU 408).

In the embodiment illustrated in FIG. 8 (in which many of the components that do not have substantive differences with like components of FIG. 7 have been omitted in fulfillment of the dual purposes of clarity and brevity), EDU 804, shown in greater detail in FIG. 9, includes relay switch network 902, and control electronics 904 (which, as its number implies, is different from control electronics 508). Control electronics 904 includes relay switch 902 that provides for additional functionality in regard to power distribution than is present in control electronics 508 as shown in FIGS. 5 and 7.

As shown in FIG. 8, transformer 802, through power cable 806, provides the sole means of power to all of motorized roller shades 106 according to an embodiment. Relay switch network 902 provides the means for directing the flow of power to motorized roller shades 106 according to a further embodiment. That is, the power from transformer 802 can be directed through relay switch network 902 to re-charge battery 506 of motorized roller shade 106 directly via power cable 806, which eliminates the need to run POE cable 406 from intelligent hub 710 to the first EDU. Further, relay switch 902 can shunt power away from one or more of control electronics 904 should it be necessary to re-charge one or more batteries 506; this prevents any current from being used by any one or more of control electronics 904 when one or more batteries 506 needs to be recharged, as discussed above. In addition, relay switch 902 allows one or more batteries 506 to re-charge each other as discussed above in the "vampire-mode" of recharging. The configuration of FIG. 8 and room automation system 800 is different than that of room automation system 700 as shown in FIG. 7 in that power to motorized roller shades 106 in room automation system 700 is provided by POE cables 406 directly from intelligent hub 710, as discussed above.

According to still a further embodiment, room automation system 800 includes additional features over that of room automation system 700: hem bars 808 contain small batteries 810, and trickle charge connectors 812 for trickle-charge re-charging of batteries 506 according to an embodiment. Small batteries 810 can be located in hem bars 808. As those of skill in the art can appreciate, hem bars 808 are used in shades and draperies to provide a place to store a weight that keeps shades 104 substantially still in the presence of light drafts, such as what might be caused by air conditioning air currents, or heating air currents, or when the shades and/or drapes are moved. Specially fabricated hem bars 808 can be made to contain small batteries 810 and relay network 902 can be programmed and/or manipulated such that a small trickle-charge re-charging current can be provided via trickle charge connection 812 to one or more of batteries 506. According to further embodiments, small batteries 810 can themselves be standard alkaline cells, or rechargeable cells, such as AA rechargeable cells, or they can be specially designed and fabricated battery packs made up of rechargeable cells such as those used in the camcorder, laptop, and cell phone industries. According to further embodiments, hem bar 808 and its components and functionality can also be implemented in room automation system 700.

According to a further embodiment, EDU 804 differs from previously presented EDU 408 in that it incorporates a Zigbee mesh network node, so that a first POE cable 406 does not need to be connected to it from intelligent hub 710, yet intelligent hub 710 and room controller 704 (as well as other devices connected to WAN 712 and/or Wi-Fi gateway 702) can and do control it via Zigbee gateway 602.

As those of skill in the art can further appreciate, and as discussed above, room automation system 800 includes any and all of the components as shown and described in reference to room automation system 700 in FIG. 7. Further, any and all of the operations and functionality described above, including but not limited to automatic addressing, remote monitoring and control, user of Zigbee gateway 602, programming, confirmation of correct wiring, configuration and reconfiguration of devices, interrogation and error reporting, memory storage of different devices, use of system configuration mode, use of time clock, connection to security system, use of streaming protocols and Cresnet®, and linking to similar room automation systems 800 (i.e., 800a linked to 800b linked to 800c, and so on), exist in and can be used in a similar manner in room automation system 800 as in regard to room automation system 700 according to further aspects of the embodiments.

As those of skill in the art can appreciate, a plurality of methods can be used for control of motorized roller shades 106, lighting 714, and the other devices by room automation systems 700 and 800 (according to further aspects of the embodiments, as discussed above, all of the functionality of the devices shown in room automation system 700 can be used in a substantially similar manner as in room automation system 800; therefore, in order to improve readability, and in fulfillment of the dual purposes of clarity and brevity, further discussion in regard to the methods of FIGS. 10-14 apply equally to room automation system 800 as in regard to room automation system 700, and therefore it will not be necessary to call out room automation system 800 in the following discussions). In controlling motorized roller shades 106 and lighting 714, it can be convenient to organize and/or define some of the components of FIGS. 6 and 7 as separate networks. Therefore, according to an embodiment, a shade control network 716 can be defined as comprising Wi-Fi gateway 702, WAN 712, room controller 704, POE cables 406, and motorized roller shades 106 (and all of its constituent components, as shown in FIG. 5). Furthermore, according to another aspect of the embodiments, a light control network 718 can be defined as comprising Wi-Fi gateway 702, WAN 712, room controller 704, Zigbee gateway 602, light dimmers 606, and lighting 714. In addition, according to another aspect of the embodiments, keypads 608, and motion sensors 604 can be considered to be part of both shade control network 716 and light control network 718. In regard to room automation system 800, shade control network 814 is substantially similar to shade control network 716, but does not include POE cable 406 between intelligent hub 710 and first motorized shade 106a, and does include transformer 802. According to a further aspect of the embodiments, light control network 718 is substantially similar for both room automation systems 700 and 800.

As described above, room controller 704 can be programmable according to an embodiment for memory storage of preset intensity levels for motorized roller shades 106. According to one method of control, room controller 704 can be programmed to store in memory therein the preset intensity levels for the dimmable loads of lighting system 714 and for motorized roller shades 106. One such method of control is discussed in regard to the method flowchart of FIG. 10.

FIG. 10 is a flowchart of method 1000 for control of motorized roller shades 106 by transmitting intensity levels from room controller 704 to motorized roller shade 106. In response to actuation of a shade preset actuator on room controller 704 (at step 1002), room controller 704 transmits the preset intensity level to motorized roller shade 106 (at step 1004). The intensity level is received by the associated motorized roller shade 106 and converted to a shade position (at step 1006). Motorized roller shade 106 then directs its EDU 408 to move shade fabric 104 to the shade position equivalent to the intensity level transmitted by room controller 704 (at step 1008).

According to a further embodiment, the preset information could first be transmitted to each of the motorized roller shades 106, as part of programming of room automation system 700. As described above, each of motorized roller shades 106 includes control electronics 508 as part of its respective EDU 408. Control electronics 508, in addition to controlling recharging of batter 506 and receipt of commands from intelligent hub 710, and transmission of data thereto as well, further can incorporate memory for storing settings, and other information, as needed.

FIG. 11 is a flowchart of method 1100 for storage of preset intensity levels at motorized roller shades 106. Using room controller 704 having GUI software, a user can be prompted to enter desired preset intensity levels for each of the motorized roller shades 106 of at step 1102. A database of preset intensities is then compiled by room controller 704 using the GUI software in room controller 705 (at step 1104) and transmitted by room controller 704 to intelligent hub 710 (at step 1106) for storage in memory at each of motorized roller shades 106 (at step 1108). According to a further embodiment, instead of entering the preset intensity levels in room controller 704, PC 414 can be used to enter and transmit the levels to room controller 704.

FIG. 12 is a flowchart of method 1200 for control of motorized roller shade 106 by transmitting a "set to preset" command from room controller 704 to each of motorized roller shades 106. According to this aspect of the embodiments, subsequent actuation of a preset actuator on room controller 704 (at step 1202) causes room controller 704 to transmit a "set to preset" command (at step 1204). This differs from method 1000 shown in FIG. 10, in which a signal representing the actual intensity level is transmitted to motorized roller shade 106 by room controller 704 based on database information stored in memory at room controller 704. According to method 1200, the "set to preset" command is transferred to motorized roller shade 106 (at step 1206) that accesses the database of information stored at motorized roller shade 106 to determine the intensity level associated with the "set to preset" command (at step 1208). Motorized roller shade 106 then converts the intensity level to an equivalent shade position and directs its EDU 408 to move shade fabric 104 to the equivalent shade position (at step 1210). Transmitting a "set to preset" command provides for reduction in the total communication time because the same "set to preset" command can be sent to each of motorized roller shades 106 rather than sending multiple signals to each motorized roller shade 106 including the intensity level associated with the preset.

While memory storage at each of motorized roller shades 106 can be beneficial, it is not required. It is within the scope of the aspects of the embodiments, for example, that the database of information that is compiled by the GUI software and delivered to motorized roller shades 106 by room controller 704 (at step 1106 of FIG. 11) could, instead, be stored in one or more storage devices centrally located with respect to room automation system 700.

The shade preset actuators of room controller 704 can be used to control motorized roller shades 106 using a toggling functionality as follows. It is known for lighting control systems, for example, to use toggling functionality to switch a dimmable lighting load between first and second intensity levels by actuation of a preset button. A processor associates the first and second intensity levels for the dimmable lighting loads with first and second states toggled by the preset button. Actuation of the preset button toggles the states between the first and second states. The processor sets the dimmable lighting load to one of the first and second intensity levels depending on the state of the preset button.

In lighting systems the first preset intensity level is typically set by default to zero and the second preset intensity level to a desired non-zero intensity. The states associated with the first and second preset intensity levels are, therefore, referred to as the "off" and "on" states. FIG. 13 is a flowchart of method 1300 for toggling the position of motorized roller shade 106 between two preset positions in response to an actuation of a shade preset actuator (at step 1302). In room control system 700, room controller 704 can be programmed to toggle motorized roller shade 106 between first and second preset shade positions (at steps 1306 and 1308, respectively) depending on first and second states (determined at decision step 1304) by toggling one of the shade preset actuators of room controller 704. For the first, or "off" state, room controller 704 can be programmed to set the associated shade position to a fully-opened shade position by default, or alternatively to a fully-closed shade position. Room controller 704 can then toggle motorized roller shade 106 between the first shade position (i.e., the default "off" shade position) and a second preset position stored in memory for motorized roller shade 106 in response to actuation of the shade preset actuator. The ability to toggle between two preset positions can be desirable for a variety of reasons including, for example, privacy concerns, lighting factors, or facilitating view from a window.

EDUs 408 for motorized roller shades 106 can typically be adapted to drive associated roller tubes 102 at one set rate of speed. Room automation system 700, however, can be adapted to direct motorized roller shade 106 to move shade fabric 104 in a stepped manner that simulates a relatively slowly, but continuously, moving shade 106. This can be accomplished by room controller 704 transmitting, in periodic fashion, a sequence of intensity levels that increase or decrease in substantially equal steps with each intensity level that is transmitted. That is, a second intensity level is greater (or smaller) by a predetermined amount in intensity than the first, and the third is greater (or smaller) than the second by the same predetermined amount, and so on. If the duration of each step, as well as the duration of intervening period between steps, is sufficiently short, the resulting movement of the shade will appear to be continuous but slower than that provided by a shade being normally driven by an EDU 408 between two shade positions. Including PC 414 running GUI software greatly simplifies programming of room controller 704 to direct stepped movement of motorized roller shades 106.

Instead of simulating a reduced motor speed using stepped movement at normal speed, the motor speed for motorized roller shade 106 can be reduced by variation in the voltage applied to motor 502 of motorized roller shade 106. In response to a motor speed command from room controller 704, a microprocessor in EDU 408 for motorized roller shade 106 could apply appropriate voltage associated with the motor speed command by varying the duty cycle of a pulse width modulated drive signal applied to motor 502. Control of motor speed for a motorized window roller shade in this manner is described in greater detail in U.S. Pat. Nos. 6,100,659 and 6,497,267. Motor speed for motorized roller shades 106 can also be controlled based on other characteristics such as frequency of a driving signal, for example.

Room automation system 700, according to an embodiment, can be programmed to address motorized roller shades 106 such that a unique identifier is associated by room automation system 700 with each motorized roller shade 106. PC 414, as described above, has a GUI interface can be used to facilitate addressing of motorized roller shades 106 to room automation system 700 in accordance with method 1400. FIG. 14 is a flowchart of method 1400 for visually identifying a particular motorized roller shade 106 by the "wiggle" method. According to method 1400, a user can enter a shade system addressing mode (at step 1402) in the GUI software by actuation of a keystroke at PC 414 or through a GUI selection prompted by room controller 704. Room controller 704 then directs one of motorized roller shades 106 to raise and lower its shade fabric 104 over a short distance (i.e., to "wiggle" shade fabric 104 at step 1404). The wiggling of shade fabric 104 provides a visual means of identifying a particular motorized roller shade 106 within room automation system 700.

In method step 1406, method 1400 generates and displays a user prompting screen, with a specific message. The message is shown in FIG. 14 at decision step 1408: "Is Desired Shade Wriggling?" If "No" is selected by the user at decision step 1408 ("No" path from decision step 1408), room controller 704 directs another motorized roller shade 106 to "wiggle" its respective shade fabric 104 (at step 1410) and again prompts the user to select "Yes" or "No" (at step decision step 1408). This procedure is repeated until the shade fabric 104 of the desired motorized roller shade 106 is wiggled room controller 704 (via operation of method 1400) and "Yes" is selected by the user at decision step 1408.

According to a further aspect of the embodiments, another method exists for visually identifying a particular motorized roller shade 106 in a shade addressing programming mode, wherein a subset of motorized roller shades 106 initially includes all of the motorized roller shades 106. According to an embodiment, room controller 704 can direct one half of the motorized shades 16 of the current subset to move to a fully-opened position and the other half of the subset to a fully-closed position. The user is then prompted by the GUI software to select "opened" or "closed" to identify the position of the desired motorized roller shade 106. The process is then repeated with the selected subset half becoming a new subset of motorized roller shades 106 and room controller 704 moving half of motorized roller shades 106 of the new subset to fully-opened and half to fully-closed. This procedure is repeated until the desired motorized roller shade 106 is the only motorized roller shade 106 in the subset.

The method just described in the previous paragraph, in which half of the motorized roller shades 106 of the subset are moved to fully-opened and half are moved to fully-closed provides a binary system of visually identifying a particular motorized roller shade 106. According to further embodiments, however, a binary system is not required. Room automation system 700 can be adapted, for example, to direct to move 1/N of the motorized roller shades 106 of the current subset to one of N shade positions. For example, motorized roller shades 106 in a current subset of shades 106 can be divided into quarters that are respectively moved to fully-opened, fully-closed, one-quarter raised and three-quarter raised positions. Those of skill in the art can appreciate that other sizes of "divisions" or "groupings" of motorized roller shades 106 are within the scope of the embodiments, and the above examples are just that and not to be taken in a limiting manner.

The following is a list of the acronyms used in the specification in alphabetical order.
3G Third Generation
4G Fourth Generation
EDU Electronic Drive Unit
GUI Graphical User Interface
HVAC Heating/Ventilation/Air Conditioning
ID Identification Number
IEEE Institute of Electrical and Electronics Engineers
IU Interface Unit
LAN Local Area Network
LCD Liquid Crystal Display
LAN Local Area Network
LED Light Emitting Diode
LTE Long Term Evolution
PC Personal Computer
POE Power over Ethernet
USB Universal Serial Bus
VAC Volts, Alternating Current
VDC Volts, Direct Current
WAN Wide Area Network The disclosed embodiments provide a system, software, and a method for controlling motorized roller shades, lighting, and providing power-over-Ethernet to the motorized roller shades. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

What is claimed is:

1. A method for controlling lights and shades, the method comprising:
    transmitting controls signals from a room controller to one or more devices, wherein said control signals represent a desired intensity level setting;
    receiving the transmitted control signals at the one or more devices;
    transferring power to a first set of said one or more devices via a power-over-Ethernet (POE) cable; and
    converting said control signals to effectuate said desired intensity level setting (808), and wherein
        said one or more devices includes motorized roller shades (106) and dimmable lighting devices, and wherein said step of transmitting comprises—
        transmitting said control signals from said room controller to an intelligent hub, wherein said control signals further include database information; and
        forwarding said controls signals from said intelligent hub to a first of one or more motorized roller shades via said POE cable, wherein each of said one or more motorized roller shades includes a respective electronic data unit for each of the at least one motorized roller shades, and wherein
        each of said electronic drive units includes
            an elongated motor, and a battery, and further wherein
            said battery is adapted to provide operating power to said elongated motor, and further wherein
        said motorized roller shade further comprises:
            a shade; and
            a hem bar located at a bottom of said shade, wherein said hem bar includes one or more small batteries electrically connected to each other and said battery of said motorized roller shade, and wherein said small batteries are adapted to provide a trickle-charge re-charging current to said battery of said motorized roller shade.

2. The method according to claim 1, wherein the step of converting comprises:
    converting a first set of said control signals representing an intensity level setting of a shade such that the motorized roller shades changes a shade position of said shade to match the desired intensity level setting; and
    converting a second set of said control signals representing an intensity level setting of a dimmable light such that dimmable light controls changes a dimming setting of said dimmable light.

3. The method according to claim 2, wherein the step of converting said first set of control signals comprises:
    transmitting a sequence of control signals to the motorized roller shades such that said motorized shade moves said shade in a series of substantially evenly timed steps of substantially equal distance to simulate a relatively slowly moving shade compared to a normal rate of driven movement for the motorized roller shade.

4. The method according to claim 3, wherein a motor speed for the at least one motorized shade is variable and wherein the method further comprises:
    transmitting a signal concurrently with the intensity level directing the at least one motorized shade to move to the associated shade position at a desired speed.

5. The method according to claim 1, wherein said step of transferring power comprises:
    transmitting a trickle-charge re-charging current from said intelligent hub to said first set of said one or more devices over said POE cable, wherein said set of said one or more devices includes motorized roller shades, and wherein
    said POE cable is connected between said intelligent hub and each electronic data unit of each at least one or more motorized roller shades in a daisy chain fashion.

6. The method according to claim 1, wherein
said electronic drive unit further includes control electronics, and wherein said control electronics includes
an input interface, and an output interface, and wherein
said input interface is adapted to receive control signals, database information, and trickle-charge re-charging current from either a preceding electronic drive unit or intelligent hub via said POE cable, and wherein
said output interface is adapted to transmit control signals, database information, and trickle-charge re-charging current to a subsequent electronic drive unit via said POE cable.

7. The method according to claim 1, wherein said electronic drive unit further comprises:
a relay switch network adapted to cause electrical power to selectively by-pass said electrical drive unit, and wherein
said relay switch network is further adapted to selectively allow one or more batteries in one or more different respective motorized roller shades to draw re-charging power from said battery in said motorized roller shade associated with said electrical drive unit.

8. A method for controlling lights and motorized roller shades, the method comprising:
providing a programmable room controller adapted to store preset intensity levels in a database of information for devices connected to the room controller;
connecting the room controller to a lighting control network including at least one dimmable light;
connecting the room controller to a shade control network that includes at least one motorized roller shade;
programming the room controller to store preset intensity levels for the dimmable lights of the lighting control network in the database of information;
programming the programmable room controller to store a preset intensity level for the at least one motorized roller shade of the shade control network in the database of information;
transferring power to said shade control network via a power-over-Ethernet (POE) cable from an intelligent hub, and further wherein
each of said at least one motorized roller shade comprises:
a shade; and
a hem bar located at a bottom of said shade, wherein said hem bar includes one or more small batteries electrically connected to each other and said battery of said motorized roller shade, and wherein said small batteries are adapted to provide a trickle-charge re-charging current to said battery of said motorized roller shade; and
transmitting a portion of the database of information that includes the preset intensity level for the at least one motorized roller shade of the shade control network from the room controller to the shade control network, wherein the shade control network is adapted to convert the preset intensity levels into preset shade positions.

9. The method according to claim 8, further comprising:
connecting a keypad to the room controller, wherein the keypad is adapted to transmit a command signal to the room controller regarding a selected preset intensity level for the at least one motorized shade of the shade control network in response to a user input;
transmitting the command signal regarding the selected intensity level from the room controller to the shade control network; and
directing the at least one motorized roller shade to move to the preset shade position associated with the selected intensity level.

10. The method according to claim 8, wherein a motor speed of a motor of the at least one motorized roller shade of the shade control network is variable and wherein the method further comprises:
programming the room controller to store a desired motor speed associated with the preset intensity level for the at least one motorized roller shade of the shade control network in the database of information for directing the motorized roller shade to move to the associated preset shade position at the desired motor speed; and
transmitting the motor speed with the associated preset intensity level to the shade control network in the portion of the database of information that includes the preset intensity level for the at least one motorized roller shade of the shade control network.

* * * * *